Oct. 31, 1967   W. A. ROSS   3,349,860
HYDROSTATIC TRANSMISSION
Filed July 2, 1964   5 Sheets-Sheet 1
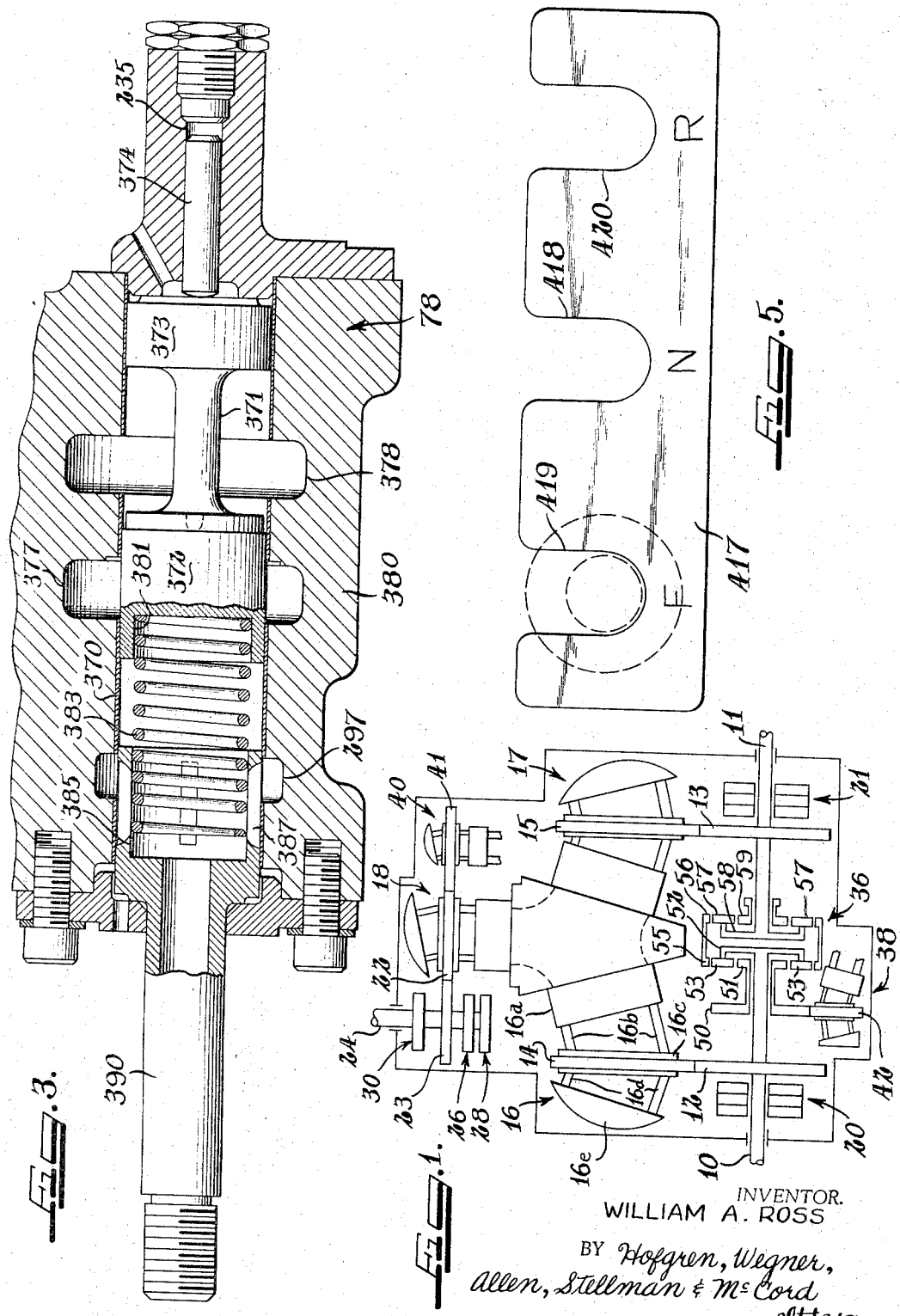
INVENTOR.
WILLIAM A. ROSS
BY Hofgren, Wegner,
Allen, Stellman & McCord
Attys.

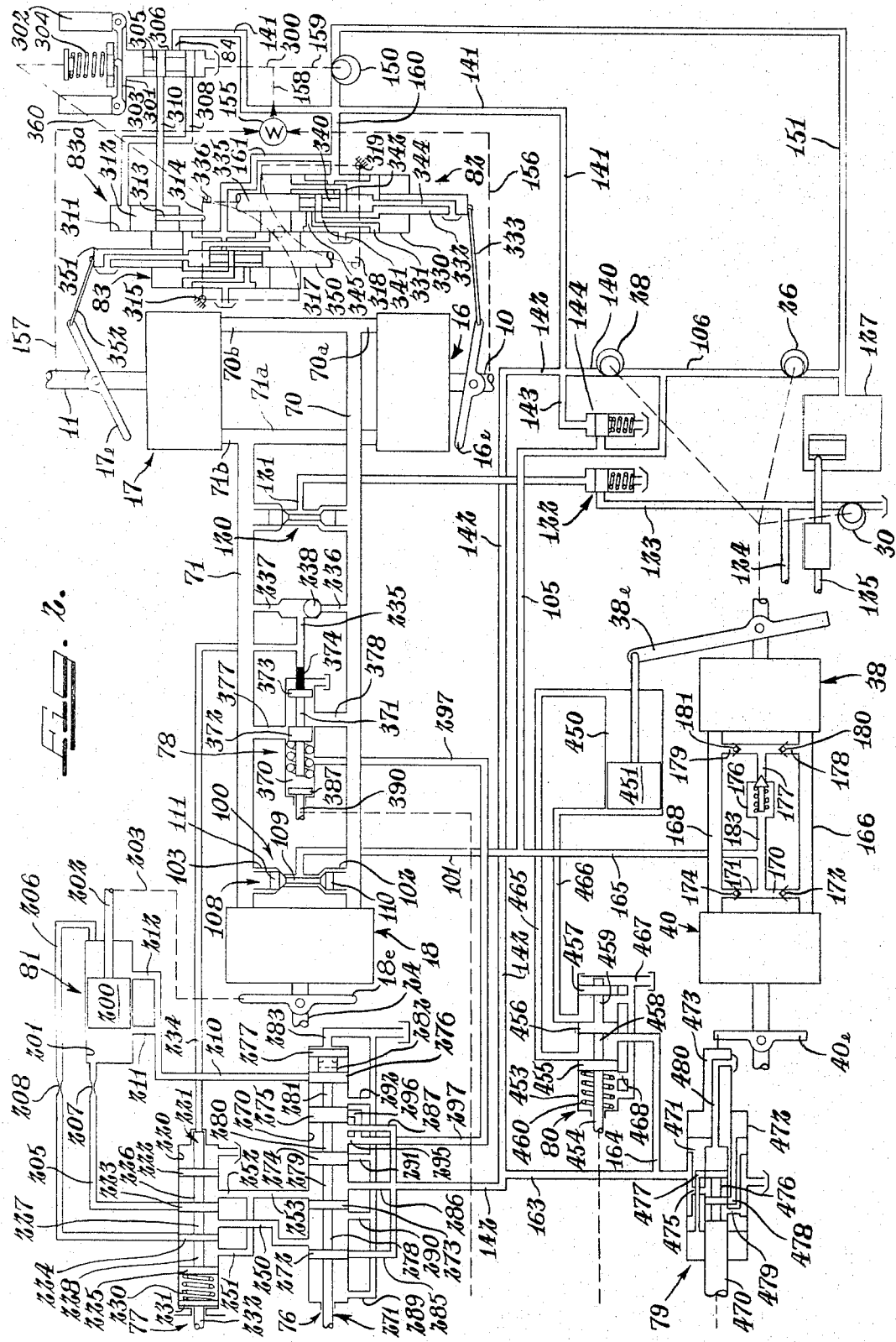

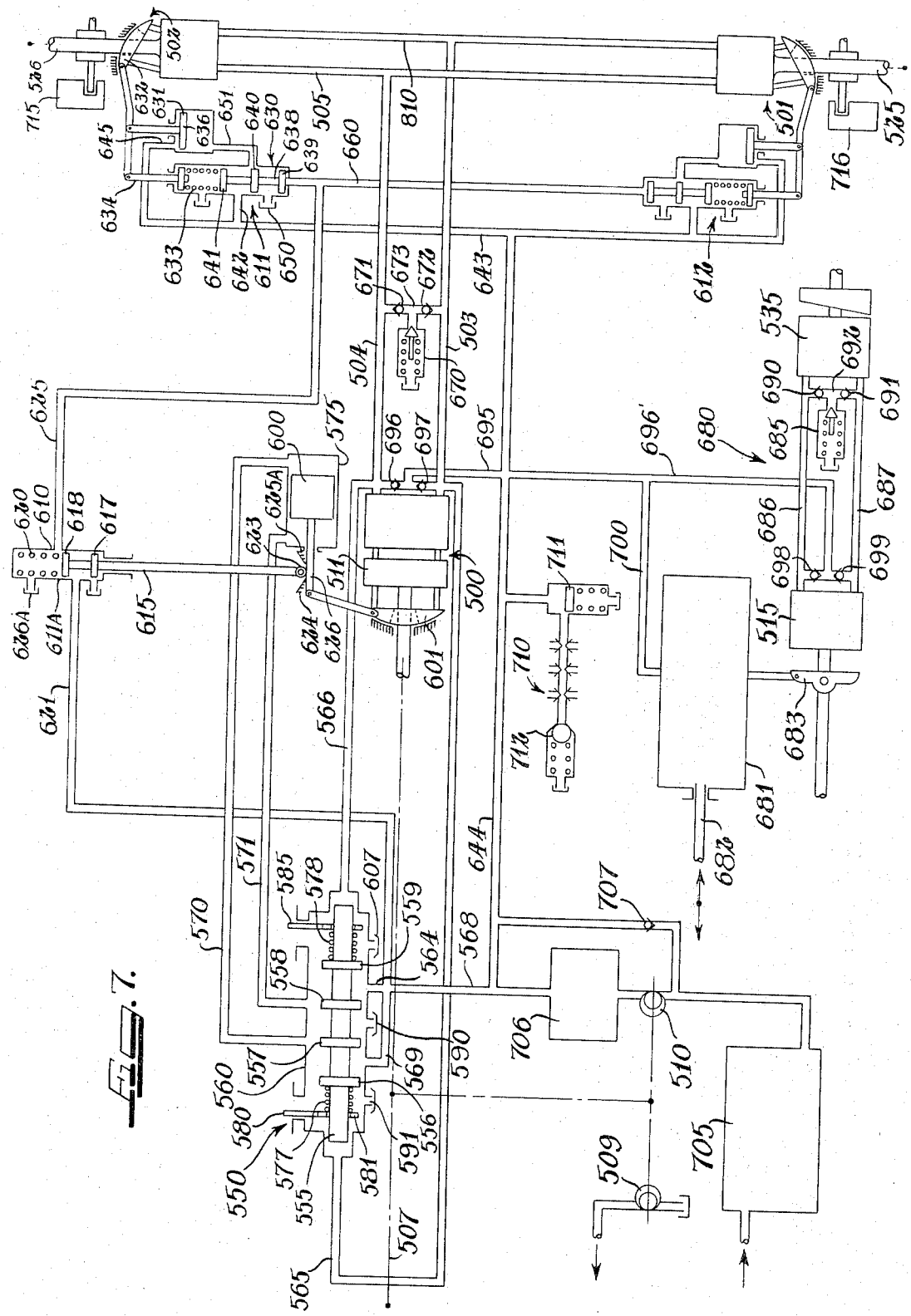

Oct. 31, 1967  W. A. ROSS  3,349,860
HYDROSTATIC TRANSMISSION
Filed July 2, 1964  5 Sheets-Sheet 5
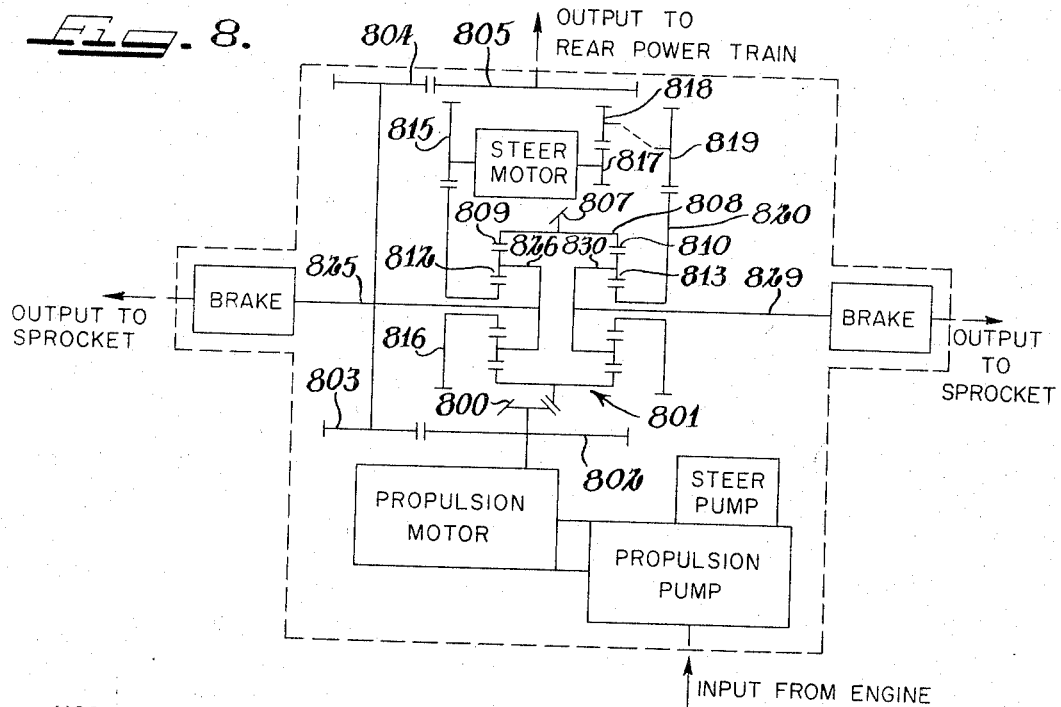
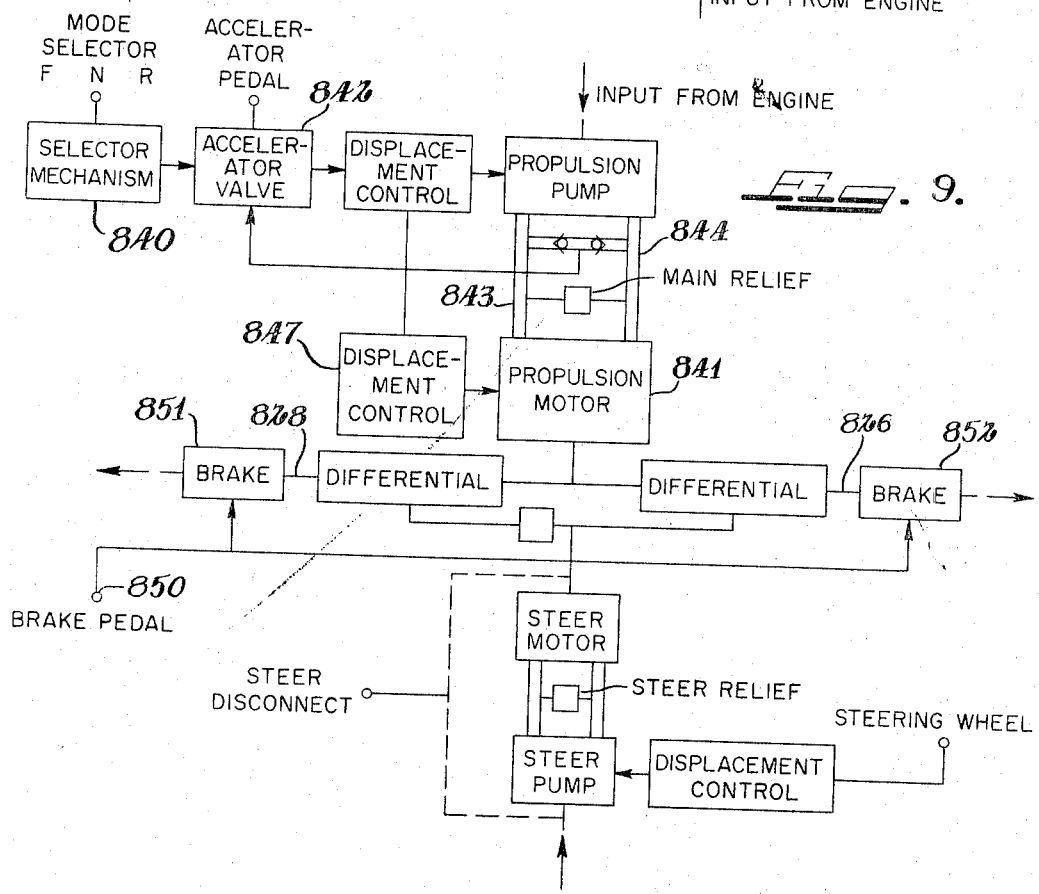

United States Patent Office 3,349,860
Patented Oct. 31, 1967

3,349,860
HYDROSTATIC TRANSMISSION
William A. Ross, Rockford, Ill., assignor to Sundstrand Corporation, a corporation of Illinois
Filed July 2, 1964, Ser. No. 379,796
42 Claims. (Cl. 180—6.44)

This invention relates generally to variable speed vehicle transmissions and more particularly to a hydrostatic transmission drive for a wheeled or tracked vehicle.

In the design of hydraulic transmissions for vehicular use, it has been conventional to vary the output speed of the transmission and thereby the vehicle speed by providing a direct control over the displacement varying means of one or more of the hydraulic units involved. That is, prior hydraulic transmissions have sought to achieve speed control by mechanically or hydraulically linking the displacement controls to an accelerator lever in the vehicle cockpit in a manner not providing smooth acceleration unless the operator gently moves the accelerator. Steering has also been a problem in prior transmission designs as they have sought to effect vehicle steering by directly varying the torque of the main drive motors. This type of design has a distinct disadvantage as it does not positively control the relative speeds of the driving wheels or tracks and the resulting turning radius becomes uncertain depending upon the load on the vehicle and the terrain over which the vehicle is traveling. Further, the controls both for steering and for speed variation in prior art devices are unsuitable for high speed performance.

It is therefore a primary object of the present invention to provide a new and improved vehicle transmission having improved control characteristics and performance.

Another object of the present invention is to provide a positive steering arrangement for a vehicle transmission. In the present invention a secondary steering transmission is superimposed on the main hydraulic transmission and positively rotates a differential connected to each of the wheel or track drive shafts to add or subtract a predetermined speed relative to each of the shafts in exact proportion to the movement of the steering wheel or other control by the vehicle operator. Since the difference speed between the tracks or wheels is dictated by the driver, the steering control is precise.

It is an additional object to provide a mode selector in connection with a steering control of the type described for selectively varying the speed difference imposed on the drive shafts for effective steering of the vehicle on land or in water.

Another object is to provide a new and improved accelerator control in a hydrostatic transmission for obtaining a response in the nature of that obtained by accelerator controls for automobiles and the like with internal combustion engines driving through standard transmissions.

It is a further object of the present invention to provide a transmission control for a hydraulic transmission in which the flow between the propulsion pump and motor (or motors) remains substantially constant throughout most of the speed range of the vehicle. The position of an accelerator pedal or similar control in the vehicle cockpit determines the setting of the system pressure between the propulsion pump and motor. At any given vehicle speed, the amount of the torque transferred to the final drive is a function of the pressure between the hydraulic pump and motor. The propulsion motor is held in full displacement from zero to approximately 20 percent of the maximum vehicle speed. The motor is held in maximum displacement at speeds less than 20 percent of the maximum vehicle speed so that maximum torque is delivered to the vehicle wheels in this range. At speeds above about 20 percent of the maximum rated speed of the vehicle, the motor displacement is reduced as speed is increased until it reaches minimum displacement at maximum vehicle speeds. By reducing the motor displacement in proportion to the vehicle speed, a constant flow is provided for vehicle speeds between maximum and 20 percent of rated maximum. This gives the transmission greater efficiency by limiting flow losses and by utilizing higher working pressures. It also allows the use of a smaller pump than would be required if the motors were left fixed at maximum displacement.

A more specific object is to provide a new and improved control for one or more transmission propelling motors for varying the displacement of the motors in response to the vehicle speed as by utilizing rotary governor means for sensing the average speed of the two drive shafts, which are in turn responsive to a manually operable accelerator control.

It is a still further object of the present invention to provide an improved hydraulic braking control in a hydraulic transmission. This is accomplished by allowing the propulsion motors to act as pumps, pumping the motive fluid over a controlled metering valve. In this manner, the vehicle energy is dissipated in the transmission.

A more specific object is to provide a new and improved combined braking and high pressure relief valve normally conditioned for the relief function and conditionable upon braking for the braking function.

It is a further object of the present invention to provide a high speed hydraulic vehicle transmission which will operate with full performance characteristics in either the forward or reverse directions of travel.

Another object of the present invention is to provide a new and improved hydraulic transmission which has an inherent torque-limiting capacity. The present transmission is controlled by varying the maximum allowable working pressure in the transmission and in this manner the maximum torque is limited to avoid possible excessive torque transmitted to the final drive during unusual operating conditions, and from the drive to the engine.

Other objects and advantages will become readily apparent from the following detailed description taken in connection with the accompanying drawings, in which:

FIG. 1 is a diagrammatic plan view of a preferred embodiment of the hydraulic transmission showing the important mechanical parts of the transmission in operative relationship;

FIG. 2 is a partially schematic hydraulic circuit of the preferred embodiment of the present invention;

FIG. 3 is a cross-sectional elevation of the braking and high pressure relief valve for the hydraulic circuit in FIG. 2;

FIG. 5 is a top view of the retaining plate which holds a direction valve selecting lever in forward, neutral or reverse positions for the transmission of FIG. 1;

FIG. 7 is a partially schematic hydraulic circuit for the embodiment of FIG. 6;

FIG. 8 is a partially schematic gearing diagram showing the differential gearing in another embodiment of the present invention; and FIG. 9 is a schematic control diagram of the embodiment of FIG. 8.

Figure 4:
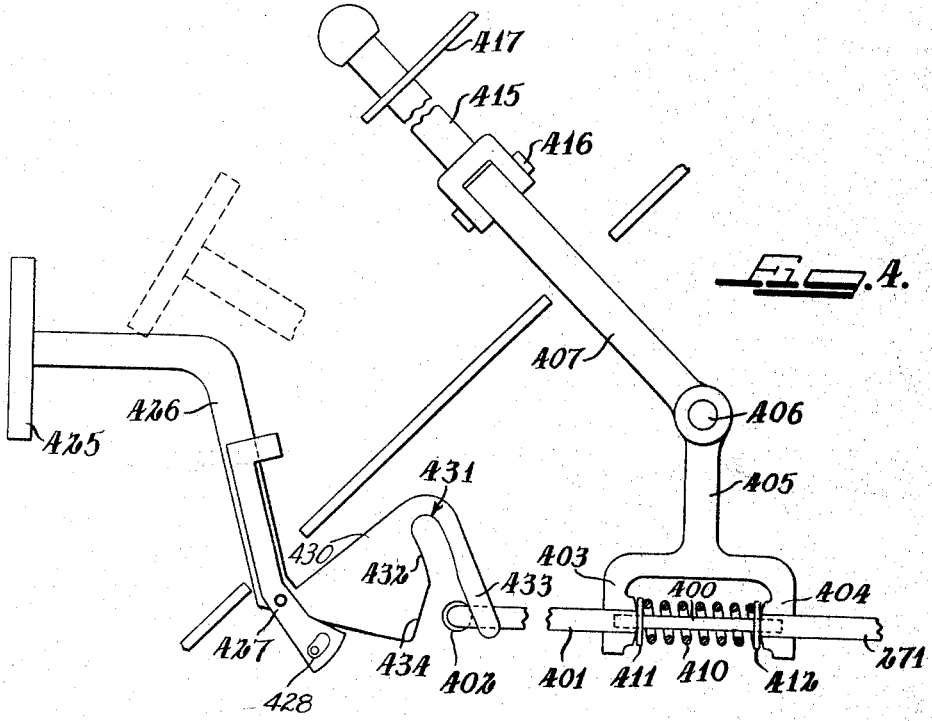
FIG. 4 is an elevation view of the brake lever and the direction valve selecting lever in the vehicle cockpit for the transmission of FIG. 1.

While the illustrated embodiments of the present invention are shown in the drawings and will be described in detail herein, the invention is susceptible of embodiment in many different forms, and it should be understood that the present disclosure is to be considered as an exemplification of the principles of the invention and is not intended to limit the invention to the embodiments illustrated. The scope of the invention will be pointed out in the appended claims.

THE TRANSMISSION OF FIGS. 1-5

Referring now to the drawings in more detail, and particularly FIGS. 1 and 2, the vehicle which is to be driven by the hydrostatic transmission may include a pair of separate coaxial drive shafts as at 10 and 11 adapted to be suitably connected with appropriate cleated propelling tracks or wheels in order to drive the vehicle in either forward or reverse directions. As will appear, such tracks or wheels may be driven at similar speeds for movement in a straight line either forwardly or reversely, and they may be driven at different speeds by the application of different torques in order to turn the vehicle. In order to drive the shafts 10 and 11, they may be provided with drive gears as at 12 and 13 fixed respectively on the shafts and meshing respectively with output gears 14 and 15 associated respectively with hydraulic drive motors 16 and 17 of a variable displacement type and adapted to be supplied with driving fluid under pressure by a main pump 18 appropriately connected in closed hydraulic circuit so that the pump delivers fluid under pressure to the motors and the motors return fluid to the pump. The pump is of a variable displacement type with provision for varying the displacement in opposite directions from neutral so as to drive the motors in either forward or reverse directions.

If desired, the output shafts may be provided respectively with parking brakes illustrated diagrammatically at 20 and 21 (FIG. 1).

The main pump 18 includes an appropriately associated input drive gear 22 which as illustrated meshes with a drive gear 23 on a shaft 24 adapted to be driven by an appropriate prime mover on the vehicle such as a gasoline engine or diesel engine including suitable starting and throttle control apparatus.

For purposes that will appear, the driving shaft 24 is also suitably connected to drive a charge pump 26, a control pump 28 and a scavenge pump 30.

An important feature of the hydrostatic transmission of this invention resides in the provision of positive steering in the form of a differential apparatus 36 associated with the shafts 10 and 11 and adapted to be driven selectively in opposite directions by means of a steering motor 38 supplied with operating fluid under pressure by the steering pump 40. The pump 40 includes a suitable drive gear 41 which may be driven by meshing with the drive gear 22 of the main pump 18, for example, and the motor 38 includes an output gear as at 42 adapted to mesh with input gearing to the differential mechanism 36.

The steering differential 36 includes a drive gear 50 fastened for rotation with an input gear 51 both concentric with and rotatable about the vehicle shaft 10. The shaft includes a gear carrier 52 having planetary pinions 53 in mesh with the input sun gear 51 and in mesh with one portion 55 of a double ring gear including a similar laterally displaced portion 56 in mesh with planetary pinions 57 on a gear carrier 58 rotatable with vehicle shaft 11. The pinions 57 also mesh with a stationary sun gear 59 concentric with the vehicle shaft 11.

The arrangement of the steering differential with reference to the steering motor 38 and the vehicle shafts 10 and 11 is such that the steering control, depending upon the direction of rotation of the steering motor 38, is adapted to add or subtract to the speed of one shaft and subtract or add similarly to the speed of the other shaft by adding or subtracting torque on the one shaft and subtracting or adding similar torque on the other shaft. For example, if the shafts 10 and 11 are stationary, and the steering motor 38 is operated to drive the gear 50 and the gear 51 in a forward direction, with the gear periphery coming out of the plane of the drawing at the bottom of the drawing and going into the plane of the drawing at the top of the drawing, the planetary pinions 53 will be rotated in what may be described as an opposite direction while the ring gears 55 and 56 are free to rotate in such opposite direction though they offer some resistance so that the gear carrier 52 and shaft 10 advance in a forward direction, the carrier 58 and shaft 11 move in a reverse direction, the pinions 57 rolling on the stationary sun gear 59. Since the shafts 10 and 11 initially had no motion, such operation of the steering control should produce a "spin" turn with the vehicle turning to the right about its center of gravity. It will be understood that in similar fashion, the motor 38 may be driven in an opposite direction to produce a turn in the opposite direction. Also, it will be understood that such steering control torque may be superimposed upon the shafts while rotating at any of infinitely variable speeds in either of forward or reverse directions.

In order to rotate the steering motor 38 in opposite directions, the steering pump 40 is of a type with provisions for varying displacement in opposite directions from neutral. The motor 38 is connected in closed hydraulic circuit with the pump 40 so that the latter delivers fluid to drive the former in either direction and the former returns fluid to the pump. While the motor is illustrated as a fixed displacement type in FIG. 1 for purposes of simplicity, it is preferably of a variable displacement type as illustrated in FIG. 2, for purposes that will appear presently.

It should be understood that variation of the inclination of the swashplate in the steering pump by a predetermined amount always results in a predetermined rotation of the steering motor, so that if the vehicle is standing still a very sharp spin turn is produced, but if the vehicle is moving slowly in either a forward or reverse direction, similar movement of the steering motor will produce a less sharp turn, and still less if the vehicle is moving rather rapidly. The effect is that the sensitivity of the steering control nicely diminishes with vehicle speed and provides a safety factor by virtue of which the vehicle could not be sharply turned at maximum speeds which may be on the order of 30 m.p.h.

The main pump 18, the two main motors 16 and 17, the steering pump 40 and the steering motor 38 are all preferably of the type disclosed and claimed in Schauer application Ser. No. 292,267, filed July 2, 1963, as a continuation-in part of Schauer's previous copending application Ser. No. 114,366, filed June 2, 1961, now abandoned, both assigned to the assignee of this application. Such pumps and motors have been characterized as a "crosshead" type which may be described generally with reference to motor 16 as including a rotatable cylinder block 16a suitably provided with an annular array of axially disposed cylinders (not shown) having pumping or motoring pistons (not shown) therein pivotally connected respectively with connecting rods or the like 16b in turn pivotally connected with axially reciprocable sliders (not shown) in a rotatable crosshead 16c. Such sliders in the crosshead are also pivotally connected with connecting rods or the like 16d suitably associated with a swashplate or cam plate 16e mounted for variable inclination to vary displacement. An important advantage of the crosshead type pump and motor resides in the arrangement described by virtue of which substantially only axial loads are imposed on the cylinder block and swashplate while the crosshead takes substantially all the side loads. The provision of a cylinder block separate from the crosshead enables long strokes since the cylinder block may be inclined relative to the crosshead in addition to the inclination of the crosshead relative to the swashplate.

Referring now to the hydraulic circuit diagram of FIG. 2, it will be seen that the main motors 16 and 17 communicate with the main pump 18 by means of a conduit 70 leading from the pump and including branch conduits 70a and 70b leading respectively to the motors and by means of another conduit 71 with branch conduits 71a and 71b communicating respectively with the separate motors, so that the pump may deliver fluid under pressure through either of the conduits 70 or 71 to the motors and the motors return fluid through the other of the conduits to the pump. Motors 16 and 17 are associated respectively with the shafts 10 and 11 and each may have its displacement varied as by varying the inclination of a swashplate 16e or a swashplate 17e, while the pump 18 is associated with the input shaft 24 and may have its displacement varied by varying the inclination of its swashplate 18e.

In FIG. 2, the various components of the circuit are illustrated with the parts positioned in readiness for operation of the vehicle in a forward mode but set for zero speed.

In general, at the outset it may be helpful to understand that the direction of vehicle movement is controlled by a directional valve 76, while the rate of movement is controlled by an accelerator valve 77. Braking is controlled by a braking valve 78 which also provides a high pressure relief function, while steering is controlled by a steering servo 79. The transmission is adapted for use with a vericle intended for operation either on land or in water, and since the cleated vehicle tracks may be used for turning either on land or in water, the rate of steering control may be varied to increase the speed differences imposed on the two tracks in water by varying the displacement of the steering motor 38 under control of a steering mode valve 80.

Displacement of the main pump 18 is controlled by a displacement varying means 81, while the displacement of the motors 16 and 17 is controlled by similar displacement control servos 82 and 83 suitably linked together for simultaneous and identical operation under control of a piston and cylinder device 83a in turn controlled by a governor valve apparatus 84.

In more detail now, the closed hydraulic circuit connecting the main pump 18 and the motors 16 and 17 is illustrated as if the conduit 71 is the high pressure conduit and the conduit 70 is the low pressure return conduit.

In order to supply fluid to the closed circuit to make up for leakage fluid, and also to supply fluid in excess of makeup quantities for purposes of displacing heated fluid to provide for cooling, the circuit includes an inlet shuttle valve 100 in association with an inlet passage 101 leading to the shuttle valve and adapted to communicate with either of a pair of branch conduits 102 or 103 leading respectively to the main conduits 70 and 71. The inlet passage 101 in turn communicates with a passage 105 leading from an outlet passage 106 from the charge pump 26. The shuttle valve includes a reciprocable shuttle valve member 108 having a reduced midportion 109 and enlarged end portions 110 and 111 arranged such that fluid in the high pressure conduit of the two conduits 70 and 71 acts upon one of the enlarged end portions, 111 as illustrated, to shift the shuttle valve member to a position in which the reduced midportion 109 places the inlet conduit 101 in communication with the low pressure passage of the two conduits 70 and 71 to allow the admission of makeup and cooling fluid supplied by the charge pump 26 through the passages 106, 105 and 101.

In order to allow for the displacement of heated fluid from the circuit by the introduction of cool fluid to the circuit through the inlet valve 100, a similar outlet shuttle valve 120 is provided in the closed circuit between the pump and motors in a position nearer to the motors so that the introduction of cool fluid near the pump and the return line to the pump requires displacement of heated fluid. The outlet valve 120 is a shuttle valve similar in construction and operation to that illustrated at 100 and for that reason need not be described in detail. It will be understood that high pressure in the conduit 71, acting on the adjacent enlarged end portion of the shuttle valve member, shifts the member to a position placing the low pressure conduit 70 in communication with an outlet passage 121 leading to a spring-biased relief valve 122 which relieves the pressure on the low pressure side of the main circuit in a manner to pass heated fluid over the relief valve when the pressure is sufficient for delivery of such heated fluid to a passage 123 and then to a passage 124 leading to a suitable cooling apparatus not illustrated.

Fluid may be returned from the cooling apparatus through a passage 125 and a filter 126 to a reservoir 127 where it may be retrieved by suction of the charge pump 26.

As previously mentioned, the charge pump 26, the control pump 28 and the scavenge pump 30 are driven by input shaft 24 under normal conditions of operation, that is, when the vehicle engine is operative. Under these circumstances, the control pump 28 delivers control fluid under pressure preferably at some value substantially higher than that of the charge fluid delivered by pump 26. For example, the charge pump may deliver fluid at approximately 150 p.s.i. while the control pump may deliver fluid at approximately 800 p.s.i. to a passage as at 140 for supply to branch passages as at 141 and 142 for purposes of suitably operating the various controls, as explained hereinafter, and excess fluid flows through a passage 143 to a relief valve 144 communicating with the makeup inlet passage 105.

As will appear, it is an important feature of the improved hydrostatic transmission herein that the vehicle with which it is associated may be pushed for purposes of starting the prime mover as under circumstances where the prime mover cannot be started according to the usual practices. In order to facilitate the supply of control fluid immediately to the various control devices under such circumstances, there is provided an output driven control pump 150 communicating with the reservoir 127 through a conduit 151 for purposes of drawing fluid from the reservoir and supplying control fluid under pressure to the control passage 141 and the various devices communicating therewith.

In order to drive the control pump 150, it is associated with a conventional type of differential 155 designated by the Greek letter sigma. The differential 155 is mechanically connected as illustrated by broken lines at 156 and 157 so that its two inputs are driven respectively by the shafts 10 and 11. The differential is constructed such that, and the sigma symbol is applied to indicate that, the two inputs are summed or added in the differential and applied to an output represented by a broken line 158 in turn connected as at 159 to drive the control pump 150. It will be understood that the added input speeds are representative of twice the average speeds of the two shafts 10 and 11 so as to be directly indicative of the actual forward or reverse vehicle speed whether the two shafts are traveling at identical speeds with the vehicle moving in a straight line or whether the shafts are traveling at different speeds with the vehicle turning. While this is not critically important in driving the control pump 150, it is important in driving the governor 84 as will appear hereinafter.

Control fluid is delivered by the control pump 28 to the governor valve 84 through the conduit 141 and through branch conduits 160 and 161 to the displacement control servos 82 and 83 respectively for the propelling motors 16 and 17. Control fluid is delivered by the control pump 28 through the conduit 142 to the direction control valve 76 and from there to the accelerator valve 77 and from there to the displacement varying means 81 for the pump 18. A branch passage 163 from the conduit 142 delivers control fluid to the steering servo 79 and a branch passage 164 delivers control fluid to the steering mode valve 80.

The charge pump 26 delivers makeup fluid through the passage 105 and a passage 165 to the circuit connecting the steering pump 40 and steering motor 38. The steering pump and motor are connected in closed hydraulic circuit as by conduits 166 and 168 so that the pump may deliver fluid under pressure through either conduit to the motor and the motor returns fluid through the other conduit to the pump. In order to admit makeup fluid to the steering circuit, the passage 165 leads to two branch passages 170 and 171 each provided with a check valve as at 172 and 174. It will be understood that the arrangement is such that fluid in the high pressure conduit of 166 and 168 closes the associated check valve while makeup fluid may be admitted through the other check valve.

A pressure relief valve is provided for the steering circuit at 176, and the latter communicates with the steering circuit through a passage 177 and branch passages 178 and 179 including respectively check valves 180 and 181, the arrangement being such that high pressure in one of the conduits 166 and 168 opens the associated check valve while maintaining the other check valve closed thereby to communicate the relief valve 176 with the high pressure conduit for relief of excess pressure through a passage 183 communicating with makeup passage 165.

Displacement of the main pump 18 is controlled by the displacement varying means 81 which includes a piston 200 reciprocable in a cylinder 201 and having a piston rod 202 suitably connected as represented by the broken line 203 to pivot the swashplate 18e in opposite directions from the neutral center position illustrated on admission of fluid under pressure to opposite ends of the piston 200 in the cylinder 201.

Fluid is admitted to opposite ends of the cylinder 201 by means of conduits 205 and 206 respectively each including a restrictive orifice as at 207 and 208, the latter being provided for purposes of preventing loss of control pressure under circumstances where one of the conduits 205 or 206 may be connected directly to control pressure delivered by the control pump 28 through the direction valve 76 and the accelerator valve 77 and the cylinder 201 is exhausted to tank through a drain conduit 210 and branch passages 211 and 212 communicating with opposite ends of the cylinder 201 when the piston 200 is centered thereon.

Fluid is supplied to the conduits 205 and 206 under control of the accelerator valve 77 which includes a valve bore 220 having a reciprocable valve member therein including a valve stem 221 with lands 222, 223, 224 and 225 thereon isolating reduced stem portions 226, 227 and 228. The valve stem 221 is urged toward the right by a spring 230 engaging the land 225 and seated against a selectively manually operable piston 231 having a rod 232 adapted to be suitably connected with a manually accessible handle or pedal for operation by a human attendant. The force of the spring 230 is opposed by the force of fluid under pressure acting on the right hand of stem 221 through a conduit 234 communicating with the high pressure conduit of the two conduits 70 and 71 connecting the main pump and main motors. Conduit 234 communicates with passage 235 in turn communicating with branch passages 236 and 237 having a ball check valve member 238 disposed therein in a manner to be moved by fluid in the high pressure conduit, for example conduit 71, to communicate the conduit 71 with the valve stem 221 to provide a feedback signal for the accelerator valve in response to manual operation as will be explained in detail presently.

The accelerator valve bore 220 also communicate with a central passage 250 and branch passages 251 and 252 from a passage 253, all leading to the direction valve 76.

In operation, the accelerator valve is utilized to control the forward and reverse speed of the vehicle so that the response is similar to the response obtained in operating the accelerator pedal in an automobile or the like where the accelerator pedal controls the engine and the engine drives the vehicle through a standard transmission. Specifically, the direction valve 76 is adapted to be placed in either of two positions to the right of and to the left of a neutral center position respectively for obtaining forward operation or reverse operation of the vehicle, the valve being illustrated in its rightmost position. Such operation of the direction valve supplies control fluid either to the passage 250 or to the passages 251, 252, 253, and as illustrated herein, when the direction valve is positioned as shown for forward vehicle operation, the passages 251, 252 and 253 are pressurized with control fluid while the passage 250 communicates with tank.

With the passages 251, 252 and 253 pressurized, it will be understood that on depression of the accelerator pedal, the spring 230 is compressed, moving the valve stem 221 to the right, thereby admitting control fluid under pressure to the conduit 206 and communicating the conduit 205 with drain. This admits fluid to the right end of the piston 200, moving the latter toward the left and inclining swashplate 18e to the left to initiate vehicle movement, since the swashplates 16e and 17e of the propelling motors are normally disposed in the maximum displacement positions illustrated. As explained in more detail hereinafter, pressure increases in the passage 71 and a feedback signal through the passage 234 to the stem 221 ultimately closes the passage 206 to hold the pump swashplate 18e.

The direction valve 76 includes a valve bore 270 having a valve stem 271 reciprocable therein and provided with spaced lands 272, 273, 274, 275, 276 and 277 isolating reduced portions 278, 279, 280, 281 and 282, but the last mentioned portion has internal passages leading to a tank port 83. The control fluid supply conduit 142 communicates with the valve bore 270 through branch passages 285, 286 and 287, while the tank port 283 communicates with the valve bore 270 through branch passages 289, 290, 291 and 292. Also communicating with the valve bore 270 are ports 295 and 296 leading to a passage 297 communicating with the brake and pressure relief valve 78.

It will be understood that with the valve stem 271 positioned as illustrated, control fluid under pressure is supplied by the control pump 28 through the conduit 142 to the branch passages 285, 286 and 287, the first branch passage of which is blocked by the land 272, the second of which supplies control fluid under pressure through the reduced stem portion 279 to the accelerator valve and the last of which communicates through the reduced stem portion 280 with the port 295. At the same time, the reduced stem portion 278 connects the passage 250 with the tank port 290. Land 276 blocks passage 210.

It will be understood also that if the valve stem 271 is moved to the left through the neutral position and to a position for operation of the vehicle in a reverse direction, the land 272 will move to a position such that the passage 250 communicates with pressure port 285 while the land 273 moves to the left to a position communicating the passage 253 with the tank port 290. Land 274 will block port 286, land 275 will block port 295, and land 277 will block passage 210. Control fluid under pressure is thus delivered to the center port 250 in the accelerator valve so that if the valve stem 221 is moved to the right, fluid under pressure is now delivered to the left of the displacement varying means 81, varying the pump displacement in the opposite direction and obtaining vehicle operation in reverse.

If the direction valve stem 271 is moved to the neutral center position, the passage 210 communicates with the reduced portion 282 and the interior passages therein so that opposite ends of the cylinder 201 are connected to drain through the port 283 in the direction valve and the pump swashplate 18e returns to neutral. Under such circumstances, the land 273 blocks the drain port 290 and pressure ports 285 and 286 communicate with passages 250 and 253 leading to the accelerator valve, so that if the accelerator valve should be actuated at such time, the control pump 28, through the passage 142, would be connected directly to tank, through the passage 205 and 206, opposite ends of the cylinder 201, the passage 210 and the drain port 283, but for the restrictive orifices 207 and 208, resulting in a loss of control pressure. The restrictive orifices limit the flow to tank and thereby maintain control pressure.

The displacement of the propelling motors 16 and 17, and therefore, the torque and speed of the shafts 10 and 11, is controlled by the output speed of the transmission through the medium of the rotary grovernor valve 84. For this purpose, the output 158 from the summer or differential 155 is connected as represented diagrammatically by broken line 300 to drive the governor 84 which may be of a conventional rotary type including a rotary flyweight carrier 301 having pivotally mounted flyweights 302 thereon adapted to move outwardly upon increase of speed of rotation of the carrier when the vehicle speed increases. Arms as at 303 on the weights 302 respectively are opposed by a compression spring 304, and when the arms move in opposition to the spring, a valve stem 305 is moved reciprocably in a valve bore 306 communicating with the control fluid passage 141 and communicating with passages 308 and 310 leading respectively to opposite ends of the control device 83.

The arrangement is such that when the accelerator valve rod 232 is depressed, resulting in increased pump displacement, there results a pressure increase as in the main conduit 71 and this results in an increase in vehicle speed so that the governor valve stem is moved upwardly to a position admitting control fluid from the passage 141 to the passage 310. As will be explained in more detail presently, this results in reducing the displacement of the motors thereby to maintain the increased speed without the need for increased flow. The increase in pressure in the conduit 71 is maintained by the accelerator valve at the level called for by the valve.

In order to vary displacement of the motors 16 and 17 in response to operation of the governor valve 84, the passages 308 and 310 communicate respectively with opposite ends of the control device 83 which includes a cylinder 311 having a piston 312 reciprocable therein and including a piston rod 313 connected to a one-quarter gear segment 314 pivotally mounted as at 315. The gear teeth on the periphery of the segment 314 mesh with a stationarily mounted rotatable pinion 317 in turn meshing with another one-quarter gear segment 318 pivotally mounted as at 319, so that the single control piston 312 causes identical movement of both gear segments 314 and 318, and the gear segments in turn control the respective servos 82 and 83 for synchronously varying the swashplate angles in the motors 16 and 17.

More particularly, the control servo 82 includes a cylinder 330 having a piston 331 reciprocable therein and provided with a piston rod 332 suitably connected as by a link 333 to vary the angle of the swashplate 16e. The piston 331 has a hollow center and receives a valve stem 335 having a free outer end pivotally connected to the gear segment 314 as at 346.

In operation, if the valve stem 335 is moved in either direction from the position shown, control fluid under pressure is delivered through the reduced stem portion 340 to one of the passages 341 or 342 leading respectively to opposite ends of the piston 331 while the other end of the cylinder is connected to drain through one of the passages 344 or 345.

In similar fashion, the gear segment 318 is pivotally connected with a valve stem 350 in the device 83 and a piston rod 351 is connected by link 352 with the swashplate 17e. Since the servo 83 is similar to that previously described at 82, no more detail need be repeated.

As an example of operation, if the vehicle speed increases and the governor valve stem 305 moves upwardly, control fluid is admitted from the passage 141 through the reduced governor valve stem portion to the passage 310 and to the lower end of the control cylinder 311, moving the piston 312 upwardly, pulling the gear segment 314 upwardly and moving the gear segment 318 downwardly. Valve stem 335 is moved upwardly admitting control fluid from the passage 160 through the reduced stem portion 340 to the passage 341 and to the lower end of cylinder 330, thereby reducing the angle of the swashplate 16e. Device 83 reacts similarly to reduce the angle of the swashplate 17e.

Upon correction of the angle of inclination of the motor swashplates, a feedback signal is provided from the gear segment 314 to the governor spring 304 as illustrated diagrammatically at 360 to increase the spring pressure as the swashplate angle is increased thereby to close the governor valve and also impose an increased setting on the governor for increased speeds so that the governor valve may operate within the very limited range of movement of the valve lands relative to the ports 308 and 310 throughout the speed range of the vehicle.

During normal operation of the vehicle in forward or reverse direction, the braking valve 78 functions as a high pressure relief valve for the main hydraulic circuit. For this purpose, when the valve stem 271 is either in the forward position or the reverse position, control fluid is admitted through the passage 297 to a spring chamber bore 370 in the braking valve to the left-hand side of a valve member reciprocable in the chamber and including a reduced stem portion 371, and lands 372 and 373 and an end stem 374. The control fluid from passage 297 acting on the left end of the relatively large land 372 establishes a relief valve setting on the order of 5000 to 6000 p.s.i., bearing in mind that the stem portion 374 subjected to the relatively higher working pressure as in conduit 71 is relatively much smaller than the land portion 372. In the event of a pressure increase above the setting of the valve, the valve stem is moved toward the left, relieving high pressure as from the conduit 71 to the low pressure conduit 70 through passages 377 and 378 between the valve and the passages 71 and 70 respectively. After initial movement of the valve member, the enlarged end at land 372 compresses a normally inactive spring 383 to stabilize valve operation during the relief function.

Referring to FIG. 3, there is illustrated an actual preferred construction for the braking and relief valve 78 including a valve housing 380 in which the bore 370 is formed for housing the valve plunger including reduced portion 371 with spaced lands 372 and 373, the plunger 374 being illustrated as a separate part bearing against the end of the valve stem adjacent the land 372. The bore 370 is formed with annular grooves appropriately communicating respectively with the ports 297, 377 and 378. As illustrated in FIG. 3, the left end of the valve stem adjacent land 372 is preferably recessed as at 381 to provide a seat for spring 383 having its opposite end seated in a similar recess 385 in a plunger 387 having an outwardly projecting stem or rod portion 390 adapted to be manually or pedally controlled for purposes of braking the vehicle.

As illustrated in FIGS. 2 and 3, the spring 383 is slightly shorter than the length between the two spring seats when control fluid under pressure is admitted through the port 297. The effect of the spacing of the spring is to apply the force of control fluid under pressure alone against the left end of the valve stem under normal operating conditions and yet stabilize operation during relief. In a manner to be described presently application of pressure to the brake rod 390, as by depressing a brake pedal, results in connecting the control pressure port 297 to drain, relieving the pressure acting against the left side of the brake valve stem. At the same time, the passage 210 from the piston and cylinder device 81 is connected to drain to bring the pump 18 out of stroke. When the pump is brought out of stroke, the delivery of fluid by the main pump 18 tends to reduce, reducing pressure in the high pressure conduit 71, while at the same time the momentum of the vehicle tends to drive the main motors 16 and 17 to function as pumps, raising the pressure in the conduit 70. High pressure fluid admitted to the plunger 374 at this time results in moving the valve stem toward the left, seating the spring 383 and ultimately compressing the same. Such movement of the valve land 372 has the effect of connecting the high pressure conduit 70 to the low pressure conduit 71 through the port 378, the reduced stem portion 371 and the port 377. Such by-pass of fluid may provide little braking effect, but depression of the braking pedal tends to move the valve land 372 toward the right, closing off the by-pass passage and regulating the flow of by-pass fluid to a rate determined by the amount of brake pedal depression thereby to control the braking.

In order to reduce the pressure of fluid acting against the left end of the brake valve member during braking, an arrangement is provided by virtue of which the direction valve 76 is placed in neutral upon initial depression of a brake pedal, for example, to move the valve stem 271 to a neutral center position in which the passage 297 communicates with the drain port 291 through the reduced valve stem portion 280.

Referring to FIGS. 4 and 5 for an understanding of the means controlling the direction valve in the manner described, and particularly FIG. 4, the directional valve stem 271 has an end portion suitably secured to a reduced intermediate rod portion 400 in turn fixedly secured to a larger end portion 401 bifurcated at its terminus and carrying a cam follower roller 402. The end portions of the members 271 and 401 are slidably mounted in opposed branches 403 and 404 of a yoke 405 pivotally mounted at 406 and including an upper arm 407. The reduced rod portion 400 is surrounded by a coil compression spring 410 bearing at opposite ends against a pair of washers or spring seats 411 and 412 normally seated respectively against the enlarged ends of stem portions 401 and 271 in a manner such that the spring centers the reduced rod 400 between the yoke branches 403 and 404. During normal operation of the direction valve, the spring 410 has the effect of maintaining the rod portions 271, 400 and 401 rigid with the yoke 405 for movement therewith. Thus, pivotal movement of the yoke arm 407 about the pivot 406 results in shifting the direction valve stem 271 in opposite directions from a neutral center position. As illustrated, the valve stem 271 is shifted to the right from the neutral center position to provide for operation of the vehicle in a forward direction.

In order to hold the direction valve stem in neutral, forward and reverse positions, the upper end of arm 407 has a handle 415 pivotally mounted on the arm about a pivot axis 416 extending in a direction transverse to the pivot 406, and the upper end of the handle 415 is adapted to be pivoted about the axis 416 to engage and disengage the handle relative to retainer notches in a retainer plate 417 illustrated in plan view in FIG. 5. Referring to the last mentioned figure, note that the plate is provided with a central laterally opening recess 418 representing the neutral position for the valve, a recess 419 representing the forward position and a recess 420 representing the reverse position. It will be understood that the handle 415 may be relieved from either of the three notches 418, 419, 420 by pivotal movement about axis 416, after which the handle and yoke 405 may then be pivoted about the axis 406 to shift the direction valve stem 271. While the stem portion 271 in FIG. 4 has been described as rigid with the stem portion 271 in FIG. 2, it will be understood that it may be necessary to provide articulated linkage connecting such portions to facilitate straight-line motion of the valve member on pivotal motion of the yoke 405.

The braking valve rod 390 is appropriately associated with a brake pedal 425 on a brake arm 426 pivotally mounted as at 427, as for example by means of an actuator 428 on the brake arm adapted to press the valve rod 390 on depression of the brake pedal. Appropriate spring means not illustrated may be provided to normally maintain the brake pedal up and return same upon release after depression.

In order to place the direction valve in neutral upon operation of the brake, the brake arm 426 includes an enlarged arm extension 430 having a cam slot therein as at 431 adapted to receive follower roller 402 on the direction valve stem portion 401. The cam slot 431 has an upper end portion 432 of substantially uniform width concentrically arcuately curved about the pivot axis 427 and a lower end portion of increasing width with diverging surfaces 433 and 434. If the direction valve stem is disposed in the central neutral position, the follower roller 402 is centrally disposed relative to cam slot 431 and depression of the brake pedal will have no effect on the direction valve stem. However, if the roller 402 is moved in either direction from the neutral central position, as for example, to the right, as shown, then upon depression of the brake pedal one of the cam surfaces 433 or 434, the former as illustrated, engages the follower roller 402 to move the valve stem to neutral. Preferably, operation of the brake valve is delayed until the direction valve is in neutral.

The braking provided herein may be described as transmission braking wherein the heat and energy required for braking are dissipated in the transmission in contrast to engine braking often provided by imposing the breaking load upon the vehicle engine for dissipation of the heat and energy therein.

To summarize the operation of the transmission in FIGS. 1–4 in forward and reverse directions at varying speeds, when the transmission is at rest as illustrated, the governor valve stem will be positioned in a lowermost position admitting control fluid under pressure from the conduit 141 through the reduced portion of the governor valve stem to the passage 308 leading to the upper end of the control cylinder 311, thereby moving the piston 312 downwardly, the gear segment 314 downwardly, and the gear segment 318 upwardly, which results in placing the motors 16 and 17 at full stroke. The displacement of the pump 18 is zero with the transmission at rest.

With the direction valve moved from neutral to the forward position as illustrated, or to the reverse position, the accelerator valve 77 functions as a torque control, and upon movement of the accelerator valve stem, the pump 18 is moved into stroke creating a relatively high pressure in conduit 71, for example, so as to begin driving the motors 16 and 17. The pressure signal in the conduit 71 ultimately is fed back to the accelerator valve stem through the passage 234 to close the accelerator valve and hold the pump at a displacement to provide the pressure called for by the accelerator valve. The system is sized such that once the speed of the vehicle is initiated and attains a predetermined rate, on the order of 5 m.p.h., the demands of the system are met by the pump 18 at approximately three-quarters of its maximum displacement, and the pump swashplate 18e thereafter remains at the three-quarters position except for minor temporary variations when the speed of the vehicle is to be changed. The motors 16 and 17 are calculated to place a relatively constant flow demand on the system, which the pump 18 is able to supply at about three-quarters of its stroke, the remainder of the pump stroke permitting temporary variations to increase the vehicle speed as described hereinafter.

Until the vehicle attains a speed of approximately 5 m.p.h., the governor spring 304 and the flyweights 302 do not move the governor valve stem and the motor swashplates 16e and 17e remain at full displacement delivering maximum torque at minimum speed. When the vehicle attains a speed of approximately 5 m.p.h., the pump swashplate 18e will attain approximately three-quarters of its stroke position, and if the demand of the accelerator valve has not been satisfied, the increasing vehicle and governor speed results in moving the governor valve stem upwardly to close off the supply of control fluid through the passage 308. Ultimately, if necessary, the governor valve stem movement continues to a position admitting control fluid under pressure to the passage 310 to start bringing the motor swashplates 16e and 17e out of stroke with increasing vehicle speed as called for by the accelerator valve.

If it is desired to decrease the speed of the vehicle, the manual pressure applied to the accelerator valve is relieved and the fluid pressure in the passage 234 moves the accelerator valve stem to the left resulting in a reduction of the angle of the pump swashplate 18e and a consequent reduction in speed of the vehicle and the governor, whereupon the governor valve stem moves downwardly to result in an increase in the angle of the motor swashplates 16e and 17e and a decreased speed as called for.

If, with the manual pressure on the accelerator valve held constant, the vehicle encounters an increased load as in the case of an uphill grade, the vehicle slows, the governor slows, the governor valve drops, resulting in an increase in motor displacement with a view toward overcoming the increased load with a consequent loss of speed.

If a decreased load on the vehicle is encountered, such as a downhill grade, the vehicle and the governor tend to speed, and this will tend to reduce the angle of the motor swashplates 16e and 17a, further increasing speed, unless the manual pressure on the accelerator valve is reduced. Thus, it will be understood that the transmission responds in much the same fashion as that obtained in connection with an accelerator control of an engine driving a standard transmission in an automobile or the like.

Referring now to the steering control, in order to vary the rate of speed difference imposed by the steering control on the two vehicle shafts 10 and 11, the angle of the steering motor swashplate 38e may be varied by a piston and cylinder device including a cylinder 450 having a piston 451 reciprocable therein and provided with a rod suitably connected to the swashplate to vary the rate between a maximum position illustrated and a lesser stroke, the latter having the effect of increasing the speed of the output of the motor for a given displacement in the pump 40.

Control of the piston 451 is exercised by the steering mode valve 80 which includes a valve bore 453 with a valve stem 454 therein including spaced lands 455, 456 and 457 isolating reduced portions 458 and 459. The valve stem 454 is normally biased to a rightmost position illustrated by a spring 460 so that control fluid under pressure is supplied from the passage 164 through the reduced stem portion 458 and a conduit 465 to the right end of the cylinder 450, placing the motor 38 in the maximum stroke position for steering during operation of the vehicle on land. The left end of the cylinder 450 communicates through a conduit 466 and reduced stem portion 459 with a tank port 467.

If the vehicle is operated in water, where steering is dependent upon the relatively less positive contact between track cleats or the like and the water, it is desirable to increase the speed of the motor 38, and under such circumstances the valve stem 454 may be moved to the left against the bias of spring 460 to a position in which the control passage 164 communicates with passage 466 through reduced stem portion 459, and passage 465 communicates through reduced stem portion 458 with a tank port 468. This results in moving the piston 451 to the right, reducing the displacement of the motor 38 and increasing its speed.

Manual steering control is imposed on the steering pump through the steering servo 79 including a manually controllable valve stem 470 reciprocable in a piston 471 disposed in a cylinder 472 and having a piston rod 473 suitably connected to vary the angle of the pump swashplate 40e in opposite directions from the neutral center position illustrated. For example, the valve stem 470 may be moved in opposite directions from the neutral center position illustrated to port fluid from inlet port 475 through reduced stem portion 476 to either of ports 477 or 478 leading to opposite ends of the piston 471 in the cylinder 472. At the same time, the opposite end of the cylinder 472 is ported to drain through port 479 or 480. The resulting movement of the piston 471 ultimately closes the valve.

THE TRANSMISSION OF FIGS. 6–7

Figure 6:
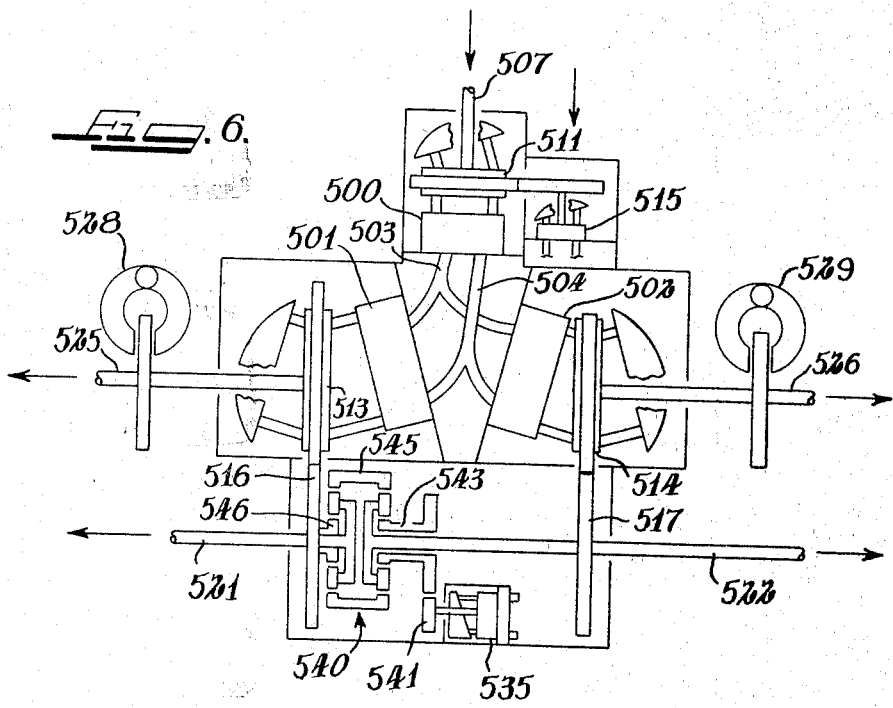
FIG. 6 is a diagrammatic plan view of another embodiment of the hydraulic transmission showing the important mechanical parts in operative relationship.

A second embodiment of the vehicle drive is shown in FIGS. 6 and 7. As noted in FIG. 6, the general arrangement of pumps and motors is similar to the embodiment of FIGS. 1–5 with a variable displacement crosshead pump 500 supplying the motive fluid to two crosshead-type variable displacement motors 501 and 502 through closed circuit conduits 503 and 504. However, the embodiment of FIGS. 6 and 7 differs from the embodiment of FIGS. 1–5 in several respects, such as the accelerator valve that controls the system torque, the motor control that controls the displacement of the crosshead motors 501 and 502, the braking circuit, the charge pump and control pressure means, and the steering motor, as will appear from the description below.

An input shaft 507, driven from a suitable prime mover, drives a scavenge pump 509 and a charge and control pump 510 by suitable gearing (not shown) in addition to being splined to the crosshead 511 of the main crosshead pump 500 for rotation thereof. A gear on crosshead 511 transmits input torque to a pump steer motor 515 in the same manner as the embodiment in FIG. 1. As the input shaft rotates, driving crosshead main pump 500, motive fluid is supplied to motors 501 and 502 which rotate the driving crossheads 513 and 514 on the crosshead motors 501 and 502, respectively, which transmit output torque through shafts 525 and 526. Disc brakes 528 and 529 associated respectively with output shafts 525 and 526 provide a parking brake for the vehicle.

The steering pump 515 and its associated controls provide a positive difference speed between the output shafts 521 and 522 as in the embodiment of FIGS. 1–5. However, a steer motor 535 is of the fixed displacement type so that the turning radius of the vehicle at any speed is determined solely by the swashplate control of the variable displacement steering pump 515. A differential 540 applies steering torque to the two shafts 521 and 522 from the steer motor 535 increasing the speed of one of the shafts and decreasing the speed of the other in proportion to the angle of inclination of the swashplate of steer pump 515. The differential 540 is substantially the same as the differential 36 in the embodiment of FIGS. 1–5 and will not herein be described in detail except to state that pinion 541 driven by the motor 535 rotates sun gear 543 which drives pinions on a carrier on the shaft 522, which pinions transmit torque to a rotatable ring gear 545 also drivingly connected to pinions on a carrier on the shaft 521 so that the carriers on the shafts rotate in different directions when the vehicle is in a spin turn, i.e. when no torque is transmitted by the motors 501 and 502 to the output shafts. If the vehicle is being driven in a forward or reverse direction by the motors 501 and 502, the differential 540 will add speed to one of the carriers on the output shaft and subtract speed from the other. A stationary sun gear 546 meshes with the pinions on the planet carrier on the shaft 521 in the same fashion as sun gear 59 in FIG. 1.

Referring in more detail now to FIG. 7, wherein the hydraulic control circuitry for the second embodiment is shown in detail, a reversible torque valve 550 controls the speed of the vehicle and the direction of travel of the vehicle by dictating the pressure in the high pressure passage, either conduit 503 or 504, depending upon the direction of travel, between the main pump 500 and the motors 501 and 502.

The torque valve consists of a valve stem 555 having annular lands 556, 557, 558 and 559 spaced thereon and slidable in valve bore 560. Control fluid is admitted to the valve bore 560 through passages 569 and 564 both connected to control fluid passage 568 which receives control fluid from the charge and control pressure pump 510. The ends of the stem 555 are subjected to the high and low pressure fluid in the main pump 500 through passages 565 and 566 which communicate with the high and low pressure motive fluid passages 503 and 504, respectively.

As shown, the torque valve is in its neutral position with the lands 557 and 558 blocking conduits 570 and 571 connected respectively to opposite ends of a pump control cylinder 575. In the absence of pressure in conduits 565 and 566, when the main pump 500 is in the neutral position, the valve stem 555 is maintained in the position shown by springs 577 and 578 surrounding each end of the stem 555 and abutting lands 556 and 559, respectively. A forward accelerator link 580 has an annular boss 581 at the lower end thereof slidable on stem 555 and engaging the spring 577, and a reverse accelerator link 585 is slidably mounted on the other end of the stem 555 and engages the spring 578.

The accelerator links 580 and 585 may be suitably connected to an accelerator pedal in the vehicle cockpit, such as a heel-toe type pedal which moves the link 580 to the right when depressed with the toe and moves the link 585 to the left when depressed with the heel. When the forward link 580 is moved to the right, it compresses spring 577 and moves the valve stem 555 to the right admitting control fluid to passage 570 from passage 569, porting passage 571 to a tank port 590 communicating with the bore 560, and connecting passage 565 with tank port 591. As fluid flows in line 570, a piston 600 slidably mounted in the pump control cylinder 575 moves to the left increasing the angle of inclination of the pump swashplate 601. And in this manner, the pressure in main conduit 504 leading to the motors 501 and 502 increases. As the pressure increases in conduit 504, passage 566 feeds back a hydraulic signal to the torque valve 550 and urges the valve stem 555 to the left against the force of the spring 577 now compressed by the accelerator link 580, so that when the pressure in the passage 504 balances the precompression of spring 577, the valve 555 will move to the left and land 557 will close passage 570 and land 558 will close passage 571 thereby stopping the piston 600 in the control cylinder 575 and temporarily maintaining a predetermined swashplate angle of inclination under certain conditions as noted more fully below.

With the swashplate 601 inclined and the input shaft 507 rotating, motive fluid is delivered to the motors 501 and 502 through the now high pressure passage 504 and a branch passage 505 connected to drive the motors 501 and 502 in rotation along with shafts 525 and 526 connected to the wheels or tracks of the vehicle.

When the reverse accelerator link 585 is moved to the left by the accelerator pedal (not shown), control fluid is admitted to passage 571 moving piston 600 to the right, porting passage 570 to tank port 590, and porting passage 566 to tank port 607, rotating swashplate 601 in a clockwise direction from neutral and reversing the main pump 500 so that high pressure fluid is supplied to the motors through conduit 503 rather than 504, and the motors reverse the direction of rotation.

A main motor control valve 610 along with motor displacement valve 611 associated with motor 502 and motor displacement valve 612 associated with motor 501, operate in a manner similar to the governor control of the embodiment of the FIGS. 1–5 to reduce the motor displacement as the speed of vehicle increases. Constant pressure is maintained in the high pressure passage of passages 503 and 504 in accordance with the torque setting of the torque valve 550 as dictated by the position of the accelerator pedal, the pressure setting varying with the position of the accelerator pedal. The main motor control valve 610 has a valve stem 615 slidable therein with lands 617 and 618. The stem 615 is biased to its lowermost position by a spring 620 seated in the upper end of valve bore 611A. Control fluid is admitted to the valve through passage 621 connected with control pressure passage 568. The lower end of valve stem 615 carries a follower 623 which rides on cam surfaces 624 and 625A fixed to a link 626 connecting the piston 600 to the swashplate 601 of the main pump 500. When the swashplate is in its three-quarter displacement position on either side of neutral, the land 618 will close passage 625, and when the pump displacement is above three-quarters of maximum, control fluid will be admitted to passage 625 from passage 621. If the displacement of swashplate 601 is less than three-quarters, passage 625 will be ported to tank at 626A.

As both of the motor control valves 611 and 612 are identical, the structure of the valve will be described with reference to control valve 611 with the understanding that it is the same as control valve 612. The motor control valve 611 consists of a spool valve 630, an actuating cylinder 631, and linkage 634 connecting the control to motor swashplate 632. The swashplate 632 of motor 502 is normally biased to a maximum displacement position by spring 633 acting against a piston on link 634, when no control pressure is flowing in passage 625 as the pressure on opposite sides of the piston 636 in the actuating cylinder 631 is equal. Spool valve 630 has a stem 638 having lands 639, 640 and 641 spaced thereon with the lower land 639 acting as a piston for moving the valve upwardly when the control pressure flows in passage 625 from the main motor control valve 610. Control pressure also is admitted to the spool valve through port 642 connected with passage 643 which communicates with a branch 644 of the control fluid circuit. Control fluid is also admitted to the upper end of motor control cylinder 631 through port 645. When control fluid flows from the main control valve 610 through passage 625, it acts on the lower face of land 639 urging the stem 638 upwardly and porting the lower end of motor actuating cylinder 631 to tank 650 through passage 651, and since the upper end of the piston 636 is supplied with a constant control pressure, the displacement of pump 500 will reduce. On the other hand, if the flow in passage 625 is reversed and ported to tank 626A, the stem 638 will move to its lowermost position connecting the lower end of the actuating cylinder 631 to control fluid, thereby increasing the displacement of the motor 502.

The motors are synchronized so that the swashplates will move together by connecting both of the valve stems 638 to the same control pressure from line 625 through branch passage 660, and subjecting both valve stems to similar feedback signals by springs 633 and links 634, to effectively lock the swashplates 632 together for simultaneous operation.

Assuming the pump to be at three-quarter displacement with no flow in passage 625, and the motor swashplate 632 in its maximum displacement position, if the speed of the vehicle is to be increased, the motor 502 will require a greater pressure, so that the stem 555 should be manually moved to the right permitting flow in line 570 to the main pump control piston 600 moving it to the left and increasing the displacement of main pump 500. In this manner, the pressure in passage 504 is increased, closing the torque valve through passage 566 and at the same time upward movement of valve stem 615 ports control fluid through passage 625 to the spool valve 630 reducing the displacement of the motor. This allows the pump to return to the three-quarter displacement position while maintaining the required pressure. In this manner, the torque valve 550 maintains required pressure in the transmission system and the motor controls reduce motor displacement to contain the demands on the main pump 500 at the three-quarter stroke position.

The torque valve 550 also effects system braking, so that if the vehicle is moving in the forward direction with the accelerator link 580 moved to the right, it is merely necessary for the operator to heel the accelerator pedal moving the reverse link 585 to the left along with link 580 and the braking will be effected in a manner presently described.

With the valve stem 555 shifted to the left as a result of movement of link 585, the control piston 600 moves to the right reducing the displacement of the main pump 500. Then because the flow of the pump is less than that demanded by the motors 501 and 502, the motors act as pumps delivering fluid to the main pump 500 which, because of its reduced displacement cannot handle the flow and is driven as a motor, loaded by the engine, thereby imposing a load on the transmission and braking the shafts 525 and 526. The swashplate 601, however, never reverses its position over neutral during braking as the pressure rise in conduit 503 and passage 565 urges the valve stem 555 to the right against the force of the spring 578 during braking and will close passage 571 before the neutral position of swashplate 601 is reached.

A high pressure relief valve 670 communicates with whichever passage 503 or 504 is the high pressure passage through one of the check valves 671 or 672 in branch 673 connecting the high and low pressure conduits 503 and 504 and prevents excessive pressures in the passages.

The positive steering unit indicated by the numeral 680 is generally similar to that disclosed in the embodiment of FIGS. 1–5, except that the steering motor 535 is of the fixed displacement type and therefore is not capable of selected speed ranges other than by the variable flow from the steering motor 515. A steering control servo 681 is similar to the steering control 79 in the embodiment of FIGS. 1–5, and will not be described in detail again except to state that the manual positioning of shaft 682 by the vehicle steering wheel (not shown) positively and proportionally positions the steer pump swashplate 683 so that the steer pump 515 delivers a proportional amount of motive fluid to the steer motor 535 which rotates the sun gear 543 on the differential 540 in FIG. 6. A high pressure relief valve 685 communicates with whichever passage 686 or 687 carries the high pressure fluid to the motor 535 through one of the check valves 690 or 691 in a branch 692 connecting the passages 686 and 687.

Makeup fluid is supplied to the hydraulic circuits in both the main pump and in the steer pump for replenishing any fluid loss due to leakage. For this purpose, passage 644 carrying makeup fluid communicating with branch passages 695 and 696' which communicate respectively with the low pressure passage of each hydraulic circuit through check valves 696 and 697 in the main pump circuit and check valves 698 and 699 in the steer pump circuit. Control fluid is admitted to the steering servo 681 through passage 700.

For providing makeup fluid to the system and control fluid for operating the various valves, a scavenge pump 509 withdraws the heated fluid from the various parts of the system and may deliver the fluid to a suitable cooling system (not shown) which delivers the cooled fluid to a tank and de-aerator shown schematically in FIG. 7 at 705. The engine driven charge and control pump 510 normally supplies fluid to the system through a filter and by-pass 706, but during a push start the motors in the system may withdraw fluid from the tank through check valve 707. Additionally, the charge and makeup pump 510 supplies fluid to jets 710 located adjacent the cylinder blocks of the various hydraulic units for maintaining them at the proper temperature. The spring-biased piston 711 prevents flow to the jets until a predetermined charge pressure is achieved and the relief valve 712 prevents excessive jet discharge.

Hydraulically actuated brakes 715 and 716 adjacent discs fixed to shafts 525 and 526 provide braking for slowing and stopping and also braking when the vehicle is parked.

To summarize the operation of the transmission in FIGS. 6 and 7, it should be understood that the transmission control is designed to provide the operator with a vehicle control similar to that found in automobiles. And this is achieved by the torque valve 550 which dictates the pressure in the main conduits 503 and 504 connecting the main pump and motors so that the operator is in effect controlling the torque of the transmission rather than positively controlling the speed thereof through mechanical manipulation of the main pump and motor swashplates.

When the accelerator is depressed by the operator for forward motion of the vehicle, the link 580 shifts to the right an amount corresponding to the position of the accelerator pedal (not shown) and fluid is admitted to passage 570 increasing the angle of inclination of the swashplate 601. The main pump 500 then delivers motive fluid to the motors through conduit or passage 504 which rotates the motors 501 and 502 to drive the vehicle in a forward direction. At this time, the motors 501 and 502 remain in their maximum displacement position as passage 625 is ported to tank at speeds less than about twenty percent of the maximum rated speeds. The motors will remain in their full displacement position thereby delivering maximum torque to the tracks or wheels of the vehicle. As the vehicle speed increases and the angle of the swashplate 601 approaches three-quarters of the full displacement, the cam 625A will move land 618 in the main motor control valve 610 above the passage 625 and admit control fluid thereto.

At speeds above twenty percent of the maximum rated speed, the control fluid through passage 625 reduces the angle of swashplates 632 on the motors to maintain a constant flow in the main circuit. The pressure in passage 504 will vary with the manual setting on the torque valve independent of engine speed. Specifically, if the forward accelerator is depressed further when traveling at some speed over twenty percent of rated speed, fluid is again delivered to passage 570 to increase the displacement of the main pump 500 above three-quarters increasing the flow in passage 504 and admitting control fluid to passage 625 which decreases the displacement of the motors 501 and 502, as a result of the new pressure in passage 504 as dictated by the accelerator link 580. The decreasing displacement of motors 501 and 502, following speed increase, contains the flow demand required of the pump. The new pressure level in passage 504 balances the stem 555 of torque valve 550 and stops and returns the pump to three-quarters stroke position to cut off flow through control passage 625, which stops motor swashplate movement.

If it is desired to reduce the speed of the vehicle, pressure is relieved from the forward accelerator link 580 admitting control fluid to the left end of main pump control cylinder 575 moving the piston to the right to decrease the flow from the pump, reducing pressure and vehicle speed. The follower 623 will then ride down on the cam 624 porting passage 625 to the tank 626A thereby moving the motors 501 and 502 toward maximum displacement thereby maintaining a constant flow demand on the pump.

If the vehicle is traveling at a constant speed above the twenty percent of rated maximum speed and encounters a load, the speed of rotation of the output shafts 525 and 526 will decrease thereby decreasing the flow requirements in motors 501 and 502 which increases pressure in conduit or passage 504 connecting the main pump and motors. This increased pressure is fed back to the torque valve 550 through passage 566 which then admits control fluid to the left end of motor pump control cylinder 575 reducing the displacement of the pump 500 to less than three-quarter displacement to reduce system pressure to the level set by the torque valve.

Passage 625 communicates with tank 626A increasing the displacement of motors 501 and 502 thereby maintaining the same pressure in passage 504 as orginally dictated by the accelerator pedal position. The vehicle then overcomes the load, such as a hill, and travels at a reduced speed with increased torque delivered to the wheels without the operator changing the position of the accelerator pedal.

The vehicle operates in a reverse direction with the present transmission shown in FIGS. 6 and 7 in the same manner as it does in the forward direction. More specifically, the torque valve 550 is moved to the left by the reverse accelerator link 585 and the swashplate 601 rotates in a clockwise direction past neutral so that the main pump 500 delivers high pressure fluid to the motors 501 and 502 through conduit 503 and branch conduit 810 reversing the direction of rotation of motors 501 and 502. The balancing action on the reversed torque control valve 550 during reverse travel is effected through conduit 565 rather than conduit 566, but the manner of operation is identical except reversed. Cam 624 acts during reverse movement to control flow through passage 625 to the motor displacement controls.

Steering is effected in this embodiment in the same manner as the embodiment in FIGS. 1–5 and will not be reiterated in detail for this reason.

THE TRANSMISSION OF FIGS. 8–9

The third embodiment of the present invention is shown in FIGS. 8 and 9 and is generally similar to the embodiment of FIGS. 1–5 except for the differential arrangement and the main vehicle motor. In this embodiment, a single propulsion motor is utilized with the split type differential.

Referring to FIG. 8, the vehicle engine drives a propulsion pump which rotates a steer pump and delivers motive fluid to a single propulsion motor which may be of the crosshead type described above. The rotating cylinder block of the crosshead type propulsion motor is connected to drive a bevel gear 800 which supplies the main input to the split differential 801 and a gear 802 connected through gears 803, 804 and 805 to another differential at the rear of the vehicle thereby providing a four-wheel or four-sprocket drive if tracks are employed to propel the vehicle. Bevel gearing 800 meshes with and rotates a bevel gear 807 fixed to a rotatable ring gear 808 having gears 809 and 810 at each end thereof which drive pinions 812 and 813, respectively.

The steer motor provides a second input to the differential 801 through gears 815 and 816 at the left side of the differential and gears 817, 818, 819 and 820 at the right side of the differential 801. The gears 817, 818 and 819 produce a rotation of sun gear 820 reversely with respect to sun gear 816 on the left side of the differential.

Output shaft 825 has a planet carrier 826 on one end thereof carrying planet pinion 812, and output shaft 829 has a planet carrier 830 on one end thereof which carries planet pinion 813. Suitable brakes are provided on the output shaft for braking to slow speed and stopping and parking.

Assuming the vehicle to be traveling in a straight line, the propulsion motor rotates the ring gear 808 which engages and turns the pinions 812 and 813 which roll on the sun gears 816 and 820 which are now stationary producing equal rotation of both output shafts 825 and 829. However, if the steering wheel is turned, then the steer pump delivers fluid to rotate the steer motor. Sun gears 816 and 820 will then rotate in opposite directions adding speed to one of the planet carriers 826 or 830 and subtracting an equal speed from the other.

The over-all circuit for the transmission as shown in FIG. 9 is generally in schematic form. As in the embodiment of FIGS. 1–5, a selector mechanism 840 determines the direction of rotation of the propulsion motor 841 and the vehicle tracks and an accelerator valve 842 sets the pressure level in the conduits 843 and 844 between the propulsion pump and motor. The accelerator valve 842 establishes the pressure displacement control 847 and maintains a constant flow demand on the system by reducing the displacement of the propulsion motor 841 as the vehicle speed increases and increasing the displacement of the propulsion motor as the vehicle speed decreases in a manner similar to the cam control of main motor control valve 611 in FIG. 7, and the motor displacement control valves 611 and 612 in FIG. 7 are unnecessary here. The propulsion motor 821 rotates the ring gear 808 in the differential as described in FIG. 8 to rotate output shafts 825 and 829.

A brake pedal 850 may be provided to actuate the brakes 851 and 852 on the output shafts. The steer pump displacement control is driven by suitable steering wheel in the vehicle cockpit to supply predetermined flow to the steer motor, to effect turning of the vehicle in the manner as described with reference to the gearing in FIG. 8.

What is claimed is:

1. A variable speed drive, comprising: an input shaft, a first variable displacement hydraulic unit driven by said input shaft, means for varying the displacement of said first hydraulic unit including a control piston, a second variable displacement hydraulic unit having a second control piston for varying the displacement thereof, passages connecting said hydraulic units each adapted to convey high-pressure fluid therebetween, one of said hydraulic units having a speed range from zero to a predetermined speed; and means for controlling the speed of said one unit including a torque control valve for delivering fluid relative to said first control piston to vary the displacement of said first hydraulic unit, means connected with said passages for nullifying the torque valve and terminating delivery of fluid to said first control piston when a predetermined pressure in one of said passages is reached, and means responsive to the speed of the second hydraulic unit for delivering fluid relative to said second control piston to reduce the displacement of said second hydraulic unit as the speed of the second hydraulic unit increases in said speed range.

2. A variable speed drive and steering mechanism for a land and water vehicle, comprising: an input shaft adapted to be driven by the vehicle prime mover, a first drive unit driven by said input shaft, a second drive unit driven by said input shaft, an output shaft connected to and driven by each drive unit and adapted to be connected to the vehicle propelling tracks or wheels; a variable displacement steer pump, a variable displacement steer motor connected to said steer pump and driven thereby, a differential connecting said steer motor and each of said output shafts to add speed to one shaft and subtract from the other, means for varying the displacement of said steer pump to vary the radius of turn of the vehicle, and means separate from said displacement varying means for selecting the speed range of said steer motor whereby steering may be effected on land or in water.

3. A variable speed drive as defined in claim 2 wherein said means for selecting the speed range includes a control piston connected to the steer motor, and a hydraulic valve for delivering fluid to said piston to establish a high and a low displacement of the motor thereby selecting the ranges of steer motor speeds.

4. A variable speed vehicle drive, comprising: an input shaft, a first hydraulic unit driven by said input shaft, means for varying the displacement of said first hydraulic unit; a second hydraulic unit having means for varying the displacement thereof, conduits connecting said first and second hydraulic units each adapted to transfer high or low pressure fluid therebetween, an accelerator control valve connected to said first unit displacement varying means for movement thereof, said accelerator control being connected to and responsive to an accelerator lever and the pressure in said conduits, and governor means for controlling the second unit displacement varying means responsive to the speed of the second hydraulic unit only to reduce the displacement of the second hydraulic unit as the speed thereof increases.

5. A variable speed drive, comprising: an input shaft, a first hydraulic unit driven by said input shaft, means for varying the displacement of said first hydraulic unit, a second hydraulic unit, conduits connecting said hydraulic units for transferring motive fluid therebetween, a selector valve for placing the displacement varying means in a forward, neutral and reverse mode, and an accelerator control valve continuously responsive to conduit pressure for varying the displacement of said first hydraulic unit, said accelerator control valve being constructed to continuously control the displacement of the first hydraulic unit throughout the speed and torque range thereof.

6. A variable speed drive, comprising: an input shaft, a first hydraulic unit driven by said input shaft, means for varying the displacement of said first hydraulic unit, a second hydraulic unit, conduits connecting said hydraulic units to transfer motive fluid therebetween, an accelerator control valve for moving said first unit displacement varying means, said valve being connected to and continuously responsive to fluid in said conduits and manually operable means for positioning said control valve in accordance with a desired system pressure, said valve being constructed to continuously control the first hydraulic unit displacement varying means to produce said desired system pressure.

7. A variable speed drive, comprising: an input shaft, a first hydraulic unit connected to said input shaft, means for varying the displacement of said first hydraulic unit, a second hydraulic unit having means for varying the displacement thereof, conduits connecting said first and second units for transferring fluid therebetween; and governor means for controlling said second displacement varying means including a speed sensing device for sensing the speed of the second hydraulic unit, a governor valve actuated by said speed sensing device, and a piston actuated by said valve for reducing the displacement of the second hydraulic unit as the speed of the second hydraulic unit increases.

8. A variable speed drive as defined in claim 7, wherein said second hydraulic unit is adapted to drive an output shaft, and said speed sensing device is driven by said output shaft; and further including a control pump connected to be driven by said output shaft and adapted to deliver control fluid to said governor valve for moving said piston, said control pump and said governor valve being effective to place the second hydraulic unit in stroke when the output shaft is driven from an external source whereby the drive is effective to transfer power from the output shaft to the input shaft during push starts.

9. A variable speed drive, comprising: an input shaft, a first hydraulic unit, means for varying the displacement of said first hydraulic unit, a second hydraulic unit having means for varying the displacement thereof, conduits connecting said first and second hydraulic units to transfer motive fluid therebetween, a selector valve for placing the first hydraulic unit selectively in a forward, neutral and reverse mode, an accelerator valve connected to said selector valve for controlling the displacement of said first hydraulic unit, said accelerator valve being responsive to and connected to said conduits so that the conduit pressure will close said accelerator valve when the pressure in said conduit reaches a preselected value; and a governor control for said second unit displacement varying means including a speed sensing device, a governor valve connected to said speed sensing device, and a piston servo connected to said displacement varying means and said valve to reduce the displacement of the second hydraulic unit as the speed of the second hydraulic unit increases.

10. A variable speed vehicle transmission, comprising: a variable displacement pump driven by said input shaft, two output shafts adapted to propel the vehicle, a variable displacement motor connected to each of said output shafts, passage means connecting said pump and said motors to transfer motive fluid therebetween; and control means for decreasing the displacement of said motors as the vehicle speed increases including means for sensing the average speed of said output shafts, and means responsive to said sensing means for varying the displacement of said motors.

11. A variable speed vehicle transmission, comprising: an input shaft, a variable displacement pump driven by said input shaft, two output shafts adapted to propel the vehicle, a variable displacement motor connected to each output shaft, passage means connecting said pump and said motors for delivering fluid therebetween; and control means for reducing the displacement of said motors as the vehicle speed increases including a differential for producing an output equal to the sum of the speeds of each of said output shafts, a speed sensing device driven by said output, a governor valve driven by said speed sensing device, a servo motor connected to each of said variable displacement motors for varying the displacement thereof, and passage means connecting said governor valve to said servo motors whereby the displacement of the motors is reduced as vehicle speed increases.

12. A variable speed transmission for a vehicle as defined in claim 11 and further including a servo valve in each of said servo motors, and means connecting said servo valves together for equal movement to maintain identical displacement in both motors.

13. A variable speed vehicle transmisison, as defined in claim 12 and further including a steering differential connected to each of said output shafts, and steering means connected to each differential to add a predetermined speed to said output shaft and subtract said speed from the other.

14. A variable speed vehicle drive, comprising: an input shaft, a first hydraulic unit driven by said input shaft, means for varying the displacement of said first hydraulic unit, a second hydraulic unit adapted to drive the vehicle wheels or tracks, two conduits connecting said first and second hydraulic units each adapted to carry high pressure fluid, means for reducing the displacement of the first hydraulic unit prior to braking, a bypass passage connecting said conduits to permit fluid flow from the second hydraulic unit to bypass the first hydraulic unit, means for restricting said bypass passage to brake the second hydraulic unit, and manually operable means for simultaneously activating said displacement reducing means and said restricting means when braking is desired.

15. A variable speed drive as defined in claim 14, wherein said means for restricting said bypass includes a valve member in said bypass.

16. A variable speed vehicle drive as defined in claim 15, including means normally yieldably maintaining the valve member in a position closing said bypass, and passage means subjecting the valve member to the pressure fluid in said conduits so that in the event of excessive pressure the valve member moves to bypass high pressure fluid from one conduit to the other.

17. A variable speed vehicle drive as defined in claim 15, including means normally yieldably maintaining the valve member in a position blocking said bypass, said manually operable means including means for moving the valve member to a position opening said bypass on reduction of pump displacement.

18. A variable speed vehicle drive as defined in claim 17, including a spring acting between said manually operable means and said valve member to yieldably actuate the valve member to restrict the bypass for braking.

19. A variable speed vehicle drive as defined in claim 15, including an additional valve member controlling the pump displacement varying means and controlled by said manually operable means to reduce pump displacement on operation of the manually operable means.

20. A variable speed drive for a vehicle, comprising: an input shaft, a first hydraulic unit driven by said input shaft, a second hydraulic unit adapted to drive the vehicle wheels or tracks, two conduits connecting said first and second hydraulic units to deliver motive fluid therebetween, a selector valve for placing the first hydraulic unit in a forward or neutral mode, a control piston for said first hydraulic unit to vary the displacement thereof, said selector valve relieving the pressure against said control piston when in the neutral mode, means for placing the selector valve in the neutral mode prior to braking, a bypass passage connecting said conduits permitting fluid from said second hydraulic unit to bypass said first hydraulic unit, means for restricting the bypass passage to brake the second hydraulic unit, and means for simultaneously activating said means for placing the selector valve in the neutral mode and said restricting means when braking is desired.

21. A variable speed drive as defined in claim 20 including means responsive to pressure in said conduits for controlling said restricting means also to prevent excessive pressure in either of said conduits during unbraked operation.

22. A variable speed drive, comprising: an input shaft, a first hydraulic unit connected to said input shaft, a second hydraulic unit adapted to drive the vehicle wheels, two conduits connecting the first and second hydraulic units, a selector valve for moving the first hydraulic unit towards a neutral position; braking and pressure relief valve means including a spool valve having passages communicating with said conduits and movable to a position where the passages communicate with one another, passage means connecting one end of the spool valve to one of said conduits, passage means connecting the other end of the spool valve to a source of fluid under pressure, said spool valve permitting fluid flow through said passages when the pressure in one of said conduits becomes excessive, and a spring seated against one end of the spool valve, brake means for moving said spring and restricting communication between said conduit connected passages to direct a portion of the flow of fluid from the second hydraulic unit to the first hydraulic unit and the energy thereof is dissipated as heat, and means for moving said selector valve to neutral during braking.

23. A variable speed drive, comprising: an input shaft, a first hydraulic unit driven by said input shaft, means for varying the displacement of said first hydraulic unit, a second hydraulic unit having displacement varying means thereon, said second hydraulic unit having a speed range from zero to a predetermined speed, passage means connecting said first and second hydraulic units, and means directly responsive to the position of said first unit displacement varying means for reducing the displacement of said second hydraulic unit as the vehicle speed increases.

24. A variable speed drive, comprising: an input shaft, a first hydraulic unit driven by said input shaft, a control piston connected to the first hydraulic unit to vary the displacement thereof, a second hydraulic unit having a control piston for varying the displacement thereof, conduits connecting said first and second hydraulic units to deliver fluid therebetween, a torque valve responsive to pressure in said conduits for controlling the position of said first unit control piston, and means directly responsive to the position of said first unit control piston for reducing the displacement of said second hydraulic unit as the vehicle speed increases, said torque valve and said means responsive to the position of the first unit control piston being operable to increase the displacement of said second hydraulic unit if the vehicle encounters an external load.

25. A variable speed drive, comprising: an input shaft, a first hydraulic unit driven by said input shaft, a second hydraulic unit, conduits connecting said first and second hydraulic units for delivering fluid therebetween, a torque valve for varying the displacement of said first hydraulic unit including a movable valve member, resilient means for initially positioning said valve in accordance with the desired pressure in said conduits, said torque valve continuously controlling the displacement of said first hydraulic unit, and passage means connecting said conduits to the movable valve member so that said valve member will continue changing the displacement of the first hydraulic unit until said desired pressure is reached.

26. A variable speed drive, comprising: an input shaft, a first variable displacement hydraulic unit driven by said input shaft, displacement varying means for said first unit including a control cylinder, a second hydraulic unit, conduits connecting said first and second hydraulic units, a reversible torque valve for varying the displacement of said first hydraulic unit in either direction including a slidable spool valve, conduit means connecting said torque valve to said control cylinder, resiliently biased movable accelerator members at each end of the spool valve for selectively moving the spool valve in either direction in accordance with a desired conduit pressure and the desired direction of rotation of the second hydraulic unit, a passage connecting each end of the spool valve to one of the conduits, whereby fluid from the spool valve will continue changing the displacement of said first hydraulic unit until the pressure in one of said passages increases to the desired level which pressure balances the spool valve against the force of one of the resilient accelerator members.

27. A variable speed drive, comprising: an input shaft; a first hydraulic unit driven by said input shaft; a second hydraulic unit; conduits connecting said first and second hydraulic units; and control means for said units including a control piston for varying the displacement of said first hydraulic unit, a torque valve for moving said control piston having passage means communicating with said conduits to feed back conduit pressure to the torque valve whereby the torque valve responds to conduit pressure, a control piston for varying the displacement of said second hydraulic unit, cam means fixed to said first control piston, a second hydraulic unit control valve driven by said cam means for delivering fluid to said second unit control piston to decrease the displacement of said second unit, said valve being operable only after the displacement of said first hydraulic unit has reached a predetermined level to decrease the displacement of said second hydraulic unit as the speed of the second hydraulic unit increases to maintain pressures in said conduits in accordance with the dictates of the torque valve, and means in said control valve for increasing the displacement of said second hydraulic unit when an external load is applied thereto including means for draining fluid from said second unit control piston as the speed of the motor decreases.

28. A variable speed drive as defined in claim 27 wherein said torque valve is operable to reduce the displacement of said first hydraulic unit to effect vehicle braking.

29. A variable displacement vehicle drive, comprising: an input shaft, a variable displacement pump driven by said input shaft, two output shafts, variable displacement hydraulic motors connected to each output shaft, means for varying the displacement of said hydraulic pump, and means responsive to the displacement of said pump for controlling the displacement of said hydraulic motors, said motor displacement control means being operable to decrease the displacement of said motors after the pump has reached a predetermined displacement, means connected to said motor displacement control means for effecting simultaneous displacement changes of said motors, a differential connected to each of said output shafts, and a positive steering mechanism connected to said differential for adding speed to one of said output shafts and subtracting an equal speed from the other.

30. A variable speed drive as defined in claim 29 wherein the means for varying the displacement of the pump includes a torque valve responsive to the pressure in said conduits so that a predetermined pressure may be obtained in said conduits.

31. A variable speed drive as defined in claim 30 and wherein said positive steering mechanism includes a hydraulic steer pump connected to said input shaft, a hydraulic steer motor driven by said steer pump, said steer motor being connected to each of said differentials, and steering means for varying the displacement of said steer pump to turn the wheels.

32. A variable speed drive comprising: an input shaft, a first hydraulic unit connected to said input shaft, a second hydraulic unit having means for varying the displacement thereof, an output shaft driven by said second hydraulic unit, conduit means connecting said first and second units for transferring motive fluid therebetween; and governor means driven by said output shaft for controlling said displacement varying means including a speed sensing device, a governor valve actuated by said speed sensing device and connected to control said displacement varying means to reduce the displacement of the second hydraulic unit as the speed of the second hydraulic unit increases, and feedback means responsive to the position of said displacement varying means for changing the response of said speed sensing device so that the governor valve has a servo effect.

33. A hydraulic transmission adapted to be driven by a self-contained prime mover comprising: an input shaft, a first hydraulic unit driven by said input shaft, a second variable displacement hydraulic unit adapted to drive an output shaft, passage means connecting said hydraulic units for transferring motive fluid therebetween; means for controlling the speed of the output shaft including fluid operable means for varying the displacement of said second hydraulic unit, control means for delivering control fluid to said fluid operable means, and a source of control fluid including a control pump driven by said output shaft, said pump being connected to deliver fluid to said control means, said control means and said control pump being effective to place the second hydraulic unit in stroke when the output shaft is driven from an external source other than the prime mover whereby the transmission is operable to transfer power from the output shaft to the prime mover during push starts.

34. A variable speed vehicle drive comprising: an input shaft adapted to be driven by a prime mover, a first hydraulic unit driven by said input shaft, a second hydraulic unit adapted to drive an output shaft, conduit means connecting said first and second hydraulic units to transfer motive fluid therebetween, said second hydraulic unit having a speed range from zero to a predetermined speed, means for varying the displacement of said first hydraulic unit from neutral to maximum displacement, control means for said displacement varying means to vary the speed of the output shaft in a lower portion of said speed range, said first displacement varying means being designed to normally satisfy the demand of the system at a predetermined displacement less than maximum, and means for reducing the displacement of said second hydraulic unit in response to an increased flow from said first hydraulic unit whereby the speed of the output shaft is varied in an upper portion of said speed range.

35. A variable speed vehicle drive comprising: an input shaft adapted to be driven by a prime mover, a first hydraulic unit driven by said input shaft, a second hydraulic unit adapted to drive an output shaft, conduit means connecting said first and second hydraulic units to transfer motive fluid therebetween, said second hydraulic unit having a speed range from zero to a predetermined speed, means for varying the displacement of said first hydraulic unit to vary the speed of the output shaft in a lower portion of said speed range, said first displacement varying means being designed to normally satisfy the demand of the system at a predetermined displacement, means for reducing the displacement of said second hydraulic unit in response to an incremental increase in displacement of said first hydraulic unit above said predetermined displacement, said first hydraulic unit displacement varying means being responsive to the reduction in displacement of said second hydraulic unit to return said first hydraulic unit to said predetermined displacement.

36. In a hydrostatic transmission, a pump, a motor, conduit means connecting the pump and the motor for transfer of fluid therebetween, fluid operable means for continuously controlling the displacement of the pump, a torque valve including a movable valve member controlling the flow of fluid relative to the fluid operable means, a manual control member and resilient means connecting the manual control member and the valve member for resiliently positioning the valve member to increase the displacement of the pump to bring the transmission up to speed, passage means communicating said conduit means and said valve member so that the valve member is responsive to working pressure in the conduit means to neutralize the valve member against the bias of said resilient means and stabilize the displacement varying means when the working pressure called for by the manual control member is obtained.

37. In a hydrostatic transmission, a pump, a motor, conduits respectively connecting the pump outlet with the motor inlet and the motor outlet with the pump inlet, a fluid operable piston and cylinder device for continuously controlling the displacement of the pump in opposite directions from neutral, a torque valve controlling the displacement varying means including a valve member movable in opposite directions from neutral for controlling the flow of fluid relative to the piston and cylinder device, a manual control member, spring means acting between the control member and the valve member for yieldably positioning the valve member to increase the displacement of the pump to bring the transmission up to speed, and passage means communicating said conduits with said valve member for moving the valve member in opposition to said spring means to neutralize the valve member and stabilize the displacement varying means when the pressure in the high pressure one of said conduits equals that called for by the position of the manual control member.

38. A combination as defined in claim 37 including, means providing a source of control fluid under pressure, branch conduits communicable with said source and leading to said torque valve, control conduits leading from said torque valve respectively to opposite ends of said piston and cylinder device, a directional valve member movable in opposite directions from neutral for selectively communicating one of said branch conduits with said source and the other of said branch conduits with tank, means on the torque valve member for selectively communicating either of said control conduits with either of said branch conduits and the other of said control conduits with the other of said branch conduits, and valve means responsive to pressure in said conduits for communicating said passage means with the high pressure one of said conduits.

39. A combination as defined in claim 38 including, a drain conduit communicating opposite ends of the piston and cylinder device with the directional valve member when the displacement varying means is in neutral, means on the directional valve member communicating the drain conduit with tank when the directional valve member is in neutral, and restrictive orifices respectively in said control conduits.

40. In a hydrostatic transmission, a pump, a motor, conduits respectively connecting the pump outlet with the motor inlet and the motor outlet with the pump inlet, a fluid operable piston and cylinder device for varying the displacement of the pump in opposite directions from neutral, a reversible torque valve controlling the displacement varying means including a valve member movable in opposite directions from neutral for selectively communicating either end of the piston and cylinder device with a source of control fluid under pressure and the other end of the piston and cylinder device with drain, compression springs acting against opposite ends of the valve member and normally maintaining the latter in neutral position, manually operable means for compressing either spring to resiliently move the valve member in either direction from neutral to increase the displacement of the pump to bring the transmission up to speed, and passages respectively communicating said conduits with opposite ends of said valve member for moving the valve member in opposition to the manually operated spring to neutralize the valve member and stabilize the displacement varying means when the pressure in the high pressure one of said conduits equals that called for by the position of the manual control member.

41. In a hydrostatic transmission, a pump, a motor, conduit means connecting the pump and the motor for transfer of fluid therebetween, fluid operable means for varying the displacement of the pump, a torque valve including a movable valve member controlling the flow of fluid relative to the displacement varying means, a manual control member and resilient means connecting the manual control member and the valve member for resiliently positioning the valve member to increase the displacement of the pump to operate the motor, means for varying the displacement of the motor normally disposed in a maximum displacement position, means responsive to speed of the motor for reducing the displacement of the motor as the speed of the motor increases, and passage means communicating said conduit means and said valve member to neutralize the valve member responsive to working pressure in the conduit means acting in opposition to said resilient means for stabilizing the displacement varying means of the pump and the motor when the working pressure, and therefore the torque, called for by the manual control member is established.

42. A combination as defined in claim 41, wherein the capacity of the pump is sufficient to normally satisfy the requirements of the transmission at a predetermined pump displacement less than maximum, so that while operating with a predetermined torque output at the motor less than maximum, the manual control may be operated to additionally stress the resilient means thereby to effect movement of the valve member resulting in increased pump displacement followed by increased motor speed and reduced motor displacement, increased working pressure and ultimate return of the pump displacement varying means to establish said predetermined pump displacement.

References Cited

UNITED STATES PATENTS

| | | | |
|---|---|---|---|
| 2,465,484 | 3/1949 | Robinson | 60—53 |
| 2,518,578 | 8/1950 | Tomlinson | 180—66 |
| 2,763,164 | 9/1956 | Neklutin | 180—6.44 X |
| 2,874,591 | 2/1959 | Thoma | 74—720.5 |
| 3,003,309 | 10/1961 | Bowers et al. | 180—6.48 |
| 3,078,656 | 2/1963 | Jedrzykowski | 180—66 X |
| 3,177,964 | 4/1965 | Anderson | 180—66 |
| 3,199,286 | 8/1965 | Anderson | 60—53 X |

FOREIGN PATENTS

| | | |
|---|---|---|
| 941,735 | 11/1963 | Great Britain. |
| 945,425 | 12/1963 | Great Britain. |

LEO FRIAGLIA, *Primary Examiner.*

BENJAMIN HERSH, *Examiner.*

J. A. PEKAR, *Assistant Examiner.*

UNITED STATES PATENT OFFICE
CERTIFICATE OF CORRECTION

Patent No. 3,349,860                                            October 31, 1967

William A. Ross

It is certified that error appears in the above identified patent and that said Letters Patent are hereby corrected as shown below:

In the heading to the printed specification, lines 4 and 5, "a corporation of Illinois" should read -- a corporation of Delaware --.

Signed and sealed this 10th day of March 1970.

(SEAL)
Attest:

Edward M. Fletcher, Jr.                          WILLIAM E. SCHUYLER, JR.
Attesting Officer                                      Commissioner of Patents